(12) United States Patent
Weingarten et al.

(10) Patent No.: US 6,538,298 B1
(45) Date of Patent: Mar. 25, 2003

(54) SEMICONDUCTOR SATURABLE ABSORBER MIRROR

(75) Inventors: Kurt Weingarten, Zürich (CH); Gabriel J. Spuehler, Zürich (CH); Ursula Keller, Zürich (CH); Lukas Krainer, Zürich (CH)

(73) Assignee: Gigatera AG, Dietikon (CH)

( * ) Notice: Subject to any disclaimer, the term of this patent is extended or adjusted under 35 U.S.C. 154(b) by 0 days.

(21) Appl. No.: 10/016,530

(22) Filed: Dec. 10, 2001

(51) Int. Cl.⁷ .......................................... H01L 31/0232
(52) U.S. Cl. ..................... 257/436; 257/432; 257/431; 257/464; 438/48; 438/65; 438/54; 438/69; 372/18
(58) Field of Search ................................ 257/431, 432, 257/436, 437, 464; 438/48, 72, 636, 54, 69, 65; 372/18

(56) References Cited

U.S. PATENT DOCUMENTS

| | | | |
|---|---|---|---|
| 4,435,809 A | * 3/1984 | Tsang et al. | 372/49 |
| 5,627,854 A | * 5/1997 | Knox | 372/99 |
| 5,701,327 A | * 12/1997 | Cunningham et al. | 372/18 |
| 5,802,084 A | * 9/1998 | Bowers et al. | 372/18 |
| 5,987,049 A | * 11/1999 | Weingarten et al. | 372/70 |
| 6,141,359 A | * 10/2000 | Cunningham et al. | 372/18 |
| 6,393,035 B1 | * 5/2002 | Weingarten et al. | 372/18 |

* cited by examiner

Primary Examiner—David Nelms
Assistant Examiner—Andy Huynh
(74) Attorney, Agent, or Firm—Rankin, Hill, Porter & Clark LLP

(57) ABSTRACT

A "low field enhancement" (LFR) semiconductor saturable absorber device design in which the structure is changed such that it has a resonant condition. Consequently, the field strength is substantially higher in the spacer layer, resulting in a smaller saturation fluence and in a higher modulation depth. However, the field in the spacer layer is still lower than the free space field or only moderately enhanced compared to the field in the free space. According to one embodiment, the absorber device is a Semiconductor Saturable Absorber Mirror (SESAM) device. In contrast with SESAMs according to the state of the art, a structure including the absorber and being placed on top of a Bragg reflector is provided, which essentially fulfills a resonance condition whereby a standing electromagnetic wave is present in the structure. In other words, the design is such that the field intensity reaches a local maximum in the vicinity of the device surface.

34 Claims, 16 Drawing Sheets

SEMICONDUCTOR SATURABLE ABSORBER MIRROR

FIELD OF THE INVENTION

This invention relates to a semiconductor device and, more particularly, to a semiconductor saturable absorber device for use in mode-locked lasers for the generation of short and ultrashort optical pulses. The invention also relates to a mode-locked laser comprising a semiconductor saturable absorber device.

BACKGROUND OF THE INVENTION

Lasers emitting short or ultrashort (in the picosecond or sub-picosecond range) pulses are known in the art. A well-known technique for short or ultrashort pulse generation is mode locking. Mode locking is a coherent superposition of longitudinal laser-cavity modes. It is forced by a temporal loss modulation which reduces the intracavity losses for a pulse within each cavity-roundtrip time. This results in an open net gain window, in which pulses only experience gain if they pass the modulator at a given time. The loss modulation can be formed either actively or passively. Active mode locking is achieved, for instance, using an acousto-optic modulator as an intracavity element, which is synchronized to the cavity-roundtrip time. However, ultra-short-pulse generation relies on passive mode-locking techniques, because only a passive shutter is fast enough to shape and stabilize ultrashort pulses. Passive mode locking relies on a saturable absorber mechanism, which produces decreasing loss with increasing optical intensity. When the saturable-absorber parameters are correctly adjusted for the laser system, stable and self-starting mode locking is obtained.

Passive mode locking can be achieved with semiconductor saturable absorber mirrors (SESAMs) (cf. U. Keller et al., "Semiconductor saturable absorber mirrors (SESAMs) for femtosecond to nanosecond pulse generation in solid-state lasers", Journal of Selected Topics in Quantum Electronics (JSTQE), Vol. 2, No. 3, 435–453, 1996, incorporated herein by reference). A SESAM is a nonlinear mirror inserted inside the laser cavity. Its reflectivity is higher at higher light intensities due to absorption bleaching obtained by using semiconductors as the nonlinear material. A SESAM typically comprises a bottom mirror and the saturable absorber structure. Optionally, there may be a spacer layer and/or an additional antireflection or reflecting coating on the top surface.

For passively mode-locked lasers using SESAMs for mode-locking, the limitation on repetition rate is the onset of Q-switching instabilities (see C. Hönninger et al., "Q-switching stability limits of continuous-wave passive mode locking," J. Opt. Soc. Am. B. vol. 16, pp. 46–56, 1999). This has also limited the laser repetition rate to the range of several hundred megahertz typically. Using the technique of coupled cavity mode-locking (RPM), a repetition rate of 1 GHz was demonstrated (see U. Keller, "Diode-pumped, high repetition rate, resonant passive mode-locked Nd:YLF laser", Proceedings on Advanced Solid-State Lasers, vol. 13, pp. 94–97, 1992). However this is a much more complicated laser due to the additional laser cavity which has to be carefully aligned with the main laser cavity.

When the conditions necessary to avoid the Q-switching instabilities in passively mode-locked lasers are examined more carefully, the following stability condition can be derived:

$$(F_{laser}/F_{sat,laser}) \cdot (F_{abs}/F_{sat,abs}) > \Delta R \quad (1)$$

where $F_{laser}$ is the fluence in the laser material, $F_{sat,laser} = h\upsilon/\sigma_{laser}$ is the saturation fluence of the laser material, h is Planck's constant, $\upsilon$ is the center laser frequency, $\sigma_{laser}$ is the laser cross-section parameter (see W. Koechner, *Solid-State Laser Engineering*, 4$^{th}$ Edition, Springer-Verlag New York, 1996), $F_{abs}$ is the fluence on the absorber device, $F_{sat,abs} = h\upsilon/\sigma_{abs-eff}$ is the effective saturation fluence of the absorber, where $\sigma_{abs-eff}$ is the effective cross-section parameter of the absorber device including a structure dependent factor and the intrinsic material cross section, and $\Delta R$ is the modulation depth of the absorber device. This equation can be used to scale a laser for operation at higher repetition rates. If all else remains constant (i.e., mode size in laser material and on the absorber, average power, and pulsewidth), as the repetition rate increases, the left-hand term decreases due to decreasing pulse energy. It is possible to avoid Q-switching under this condition by arbitrarily decreasing the modulation depth $\Delta R$. However, below a certain modulation depth, the absorber will not have a strong enough effect to start and sustain mode-locking.

For further clarity we simplify Eq. (1) to the following:

$$S_{laser} \cdot S_{abs} > \Delta R \quad (2)$$

where $S_{laser}$ is the fluence ratio in the laser material, and $S_{abs}$ is the fluence ratio on the absorber. This reduced notation allows us to simplify the further discussion. To achieve the maximum figure of merit, one can change the laser design to increase the fluence ratio $S_{laser}$ in the laser material, or to increase the fluence ratio $S_{abs}$ in the absorber. In this document, we concentrate on the latter measure.

In pulse generating lasers with high repetition rates, e.g. above 1 GHz, the pulse energy of course is lower for a given average power from the laser. Thus, as the pulse repetition rate goes up, it becomes increasingly harder to saturate the SESAM and thus to get modelocking. It would therefore be desirable to obtain an absorber device with a decreased saturation fluence for high repetition rate pulse generating lasers.

A reduced saturation fluence would make operation with a reduced fluence level on the SESAM possible. The beam spot size on the absorber medium could be chosen to be larger. This would be desirable for both pulse generating lasers with a high repetition rate and for pulse generating lasers operating at a high average power: A larger spot size on the absorber make cavity design easier and, very importantly, be an advantage concerning thermal issues. A very high fluence can result in optical damage. Damage levels of SESAM absorbers have been measured in the range of 30 mJ/cm$^2$. By decreasing the saturation fluence of the absorber and by then increasing the spot size on the absorber, the laser can be kept well off the damage level. Next to possible thermal damages, a very high fluence (but still below the damage threshold) may cause the laser to operate with multiple pulses per round trip, i.e., a form of harmonic mode-locking. This may be desirable as a method to increase the repetition rate of the laser. However, it may result in decreased operation stability of the laser. Thus, $S_{abs}$ is limited to about 10–30 for fundamental mode locking.

Minimum saturation fluence can be achieved by positioning the absorber medium at or near the peak of the standing wave in the SESAM.

Other absorber materials with higher cross sections, i.e., lower saturation fluences, could be found in theory. However, this is a very difficult material problem, the solution of which in the near of even far future is uncertain.

In the paper "Erbium-Ytterbium Waveguide Laser Mode-Locked with a Semiconductor Saturable Absorber Mirror", IEEE Photonics Technology Letters, Vol. 12, No. 2, February 2000. E. R. Thoen et al. propose the use of a SESAM for mode-locking a waveguide laser with a resonant, multi-layer dielectric coating in order to increase the absorption and to lower the saturation fluence. A resonant structure as proposed in this paper, however, brings about high losses. It is therefore only useful in set-ups with very high gain such as the waveguide lasers disclosed in this paper. In addition, the resonance condition makes it delicate to fabricate.

More generally, resonant Fabry-Perot saturable absorbers are considered to be unsuitable as modulators for mode-locked lasers, because the loss and the group delay dispersion (GDD) which they introduce are quite high (cf. M. J. Lederer et al., "An Antiresonant Fabry-Perot Saturable Absorber for Passive Mode-Locking Fabricated by Metal-Organic Vapor Phase Epitaxy and Ion Implantation Design, Characterization, and Mode-Locking", IEEE Journal of Quantum Electronics, Vol. 34, No. 11, November 1998).

A different question is addressed by D. Knopf et al. in "All-in-one dispersion-compensating saturable absorber mirror for compact femtosecond laser sources", Optics Letters 21, p.486 (1996). In this publication a combined absorber-dispersion compensating device is disclosed. Such a device is an absorber structure with means for implementing a negative Group Delay Dispersion (GDD, in this reference called Group Velocity Dispersion GVD).

SUMMARY OF THE INVENTION

According to this invention, a "low-field enhancement resonant" (LFR) semiconductor saturable absorber device design is proposed. In this design, the structure is changed with respect to the prior art such that it no longer satisfies the anti-resonant condition but a resonant condition. Consequently the field strength is substantially higher at the position of the absorber layer or absorber layers, resulting in a smaller saturation fluence and in a higher modulation depth.

However, the resonance is such that that the field within the resonant structure is lower than the field in free space or that it is only moderately enhanced compared to the free space field, e.g. by not more than a factor 10. As a consequence, the device does not have as narrow a band structure as resonant structure with a high field enhancement, e.g. a high finesse resonant structure.

In one embodiment, the absorber device is a Semiconductor Saturable Absorber Mirror (SESAM). In contrast with SESAMs according to the state of the art, the structure comprising the absorber, e.g. a spacer layer, is provided which essentially fulfills a resonance condition. A standing electromagnetic wave is present in the structure. In other words, the design is such that the field intensity reaches a local maximum in the vicinity of the device surface, i.e. at the device/air interface.

The advantages of the LFR-SESAM design according to the invention over the prior art are the following:

(a) A high field enhancement resonant SESAM would be difficult to fabricate, because extremely tight tolerances are required, and more temperature sensitive than the LFR-SESAM according to the invention. A LFR-SESAM is a good compromise between fabrication difficulties and improved saturation fluence.

(b) There may be no extra post-processing steps required because the LFR-SESAM is manufactured during the MBE or MOCVD fabrication. Thus, e.g. an entire LFR-SESAM structure may be fabricated in a MBE set-up without post processing. This also would be advantageous concerning the losses, since the post processed layers tend to be thicker and have more defects. It also reduces the total fabrication cost due to reduced number of processes and handling steps.

(c) The SESAM design according to the invention gives new design degrees of freedom. The modulation depth of an absorber of a given thickness and composition is increased compared to SESAMs with anti-resonant design. Thus, the absorber layer thickness may be reduced while still the modulation depth is still kept at a sufficiently high level for SESAM operation. Especially, very thin absorber layers below the critical thickness can be grown epitaxially without relaxation even when the layer material is highly lattice mismatched with the substrate.

(d) Reducing the saturation fluence and at the same time keeping the modulation depth at a customary level reduces the mode-locked-Q-switched threshold. This means that a given laser can be operated to higher repetition rates or with reduced output power without Q-switching.

(e) Reducing the saturation fluence makes possible to operate at reduced fluence levels, e.g. by reducing the spot size on the absorber. By this, intensity-dependent damages may be prevented in high power lasers or in high repetition rate lasers.

(f) The possibility to operate with larger beam spot sizes on the absorber gives additional cavity designs of freedom.

(g) Reducing the mode-locked-Q-switched threshold also means that the laser has a more "gentle" turn-on, i.e., it is less likely to emit a large Q-switch pulse during turn-on, which could damage the SESAM and/or other optical components in the laser or in following optical systems (e.g., components for nonlinear conversion or amplification).

(h) With the present invention, it may be even possible to design lasers that go straight from cw to cw-mode-locked with no mode-locked-Q-switched regime, which again improves robustness against damage as in the point before.

A possible disadvantage of the SESAM device according to the invention might be that the device ends on a standing-wave node. Consequently the field strength is maximum at the top surface. This could lead to optical damage of the top surface. A passivating layer on the top surface of the SESAM device could decrease the danger of such optical damage. The passivating layer prevents oxygen and other contaminants from migrating into the semiconductor structure, and also holds in place any contaminants that may already exist on the face of the device. Al the same time, the passivating layer can be made very thin so that it is optically transparent and does not substantially affect the reflectivity and absorption structure of the device. A typical passivating layer for example would consist of a deposition of 2 to 20 nm, preferably 2 to 4 nm, of silicon on the top surface of the SESAM device before it has been removed from its fabrication chamber and exposed to possible contaminants. Passivation techniques for semiconductor laser devices have been disclosed in U.S. Pat. No. 5,144,634, Gasser et al., "Method for mirror passivation of semiconductor laser diode".

DESCRIPTION OF THE PREFERRED EMBODIMENTS

FIGS. 1–5 refer to a typical standard low field enhancement antiresonant SESAM structure as known from the state of the art. These figures are included for comparison with the FIGS. 6–43 which refer to embodiments of the SESAM according to the invention and are discussed further below.

Figure 1:
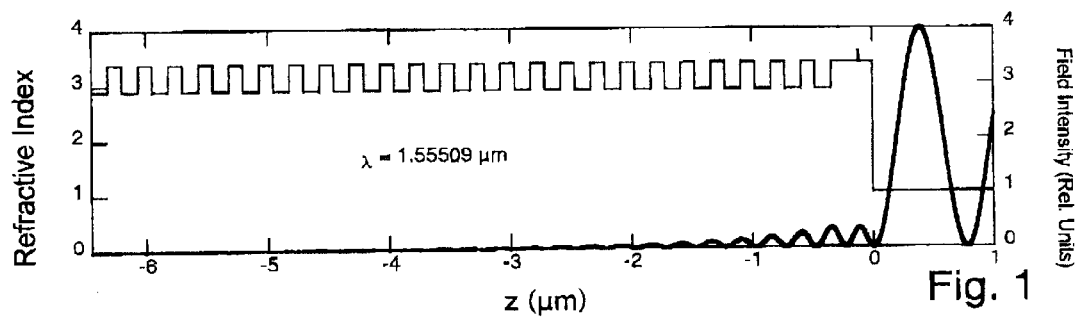
FIG. 1 is a graphical representation of the relative field intensity and the refractive index vs. position for a standard low field enhancement antiresonant SESAM device according to the state of the art.

FIG. 1 shows the relative field intensity and the index of refraction versus a position for a state-of-the-art SESAM structure. The position is measured along an axis which is perpendicular to the device surface. The SESAM comprises a stack mirror (a Bragg reflector) consisting of quarter-wave pairs of low-index/high-index materials. On the stack mirror is placed a spacer layer with a thickness of approximately $\lambda/4, 3\lambda/4, 5\lambda/4, \ldots$, where $\lambda$ is the wavelength of the laser radiation in the spacer layer. An absorber medium is placed inside the spacer layer, preferably at a maximum of the field intensity. The top surface of the SESAM starts on the right-hand side of the figure. In this figure, as well as in the following corresponding figures, the relative intensity is scaled in a manner that the maximum intensity outside the SESAM is 4.

Figure 2:
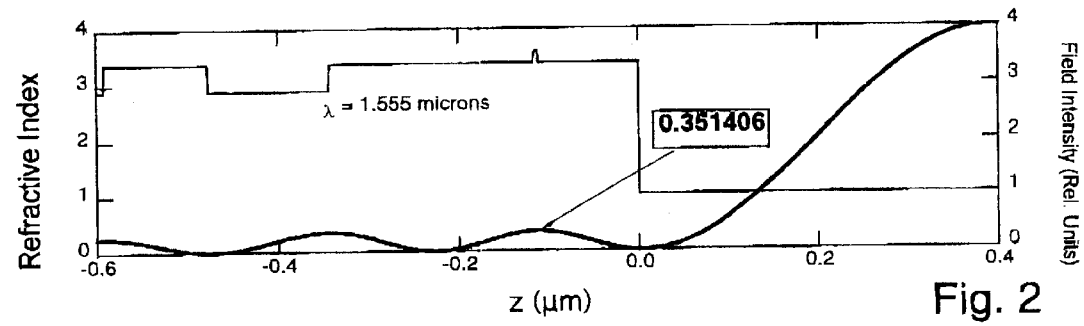
FIG. 2 is a close-up of the topmost part of the SESAM device of FIG. 1.

FIG. 2 shows a close-up of the field and refractive-index map of FIG. 1 in the region of the spacer layer. For this state-of-the-art SESAM, the relative field intensity at the absorber medium is about 0.351.

Figure 3:
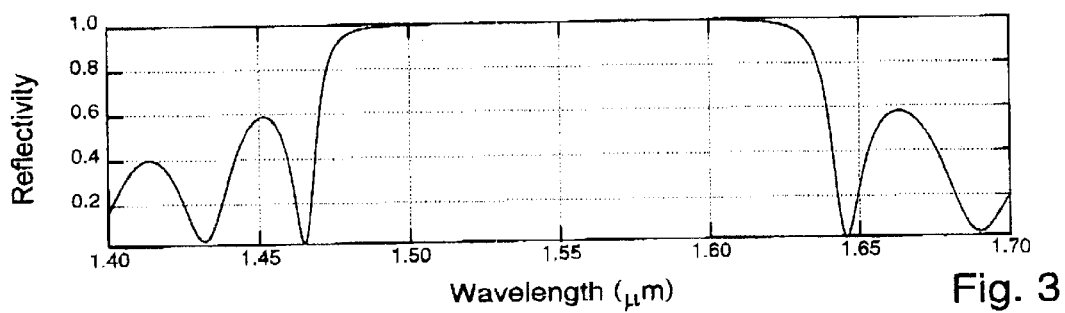
FIG. 3 is a graphical representation of the reflectivity vs. light wavelength for a standard antiresonant SESAM device according to the state of the art.
Figure 4:
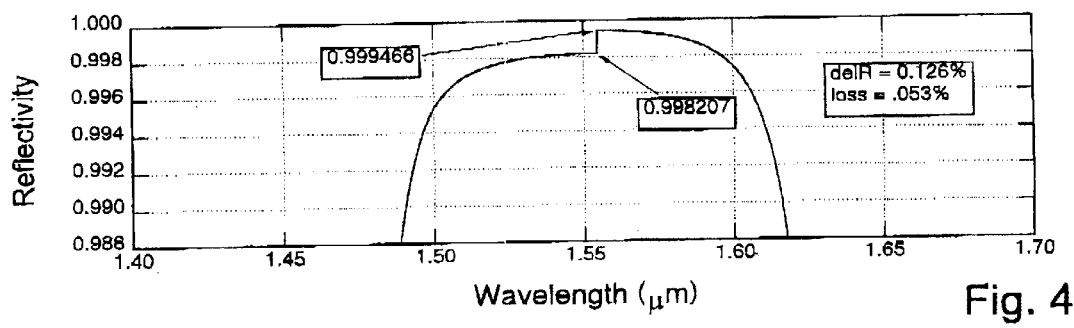
FIG. 4 is a close up of the center part of FIG. 3 with a different scale

The reflectivity calculated for the SESAM of FIG. 1 is plotted in FIGS. 3 and 4. The calculation of this figure is based on a simplified model, according to which no electronic states are present in the bandgap of the semiconductor absorber medium. The reflectivity has values R>0.998 at the laser wavelengths for which the SESAM is designed, e.g., for $\lambda \approx 1.55$ μm. The modulation depth ΔR according to this model is 0.126%, the non-saturable losses amount to 0.053%.

Figure 5:
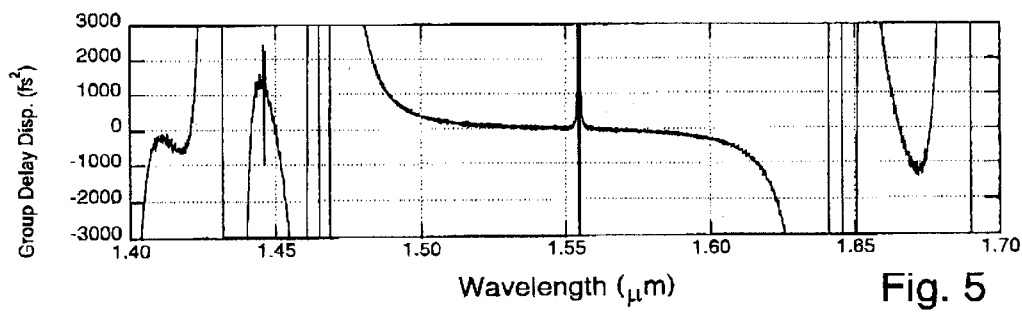
FIG. 5 is a graphical representation of the group delay dispersion vs. light wavelength for a standard low field enhancement antiresonant SESAM device according to the state of the art.

A graphical representation of the group delay dispersion calculated for the standard SESAM is shown in FIG. 5. At the center design wavelength of $\lambda = 1.55$ μm, the curve is very flat and has very low values. (The peak at the absorption edge above 1.55 μm is believed to be an artefact originating from the simplifications of the model and/or numerical instabilities).

Figure 6:
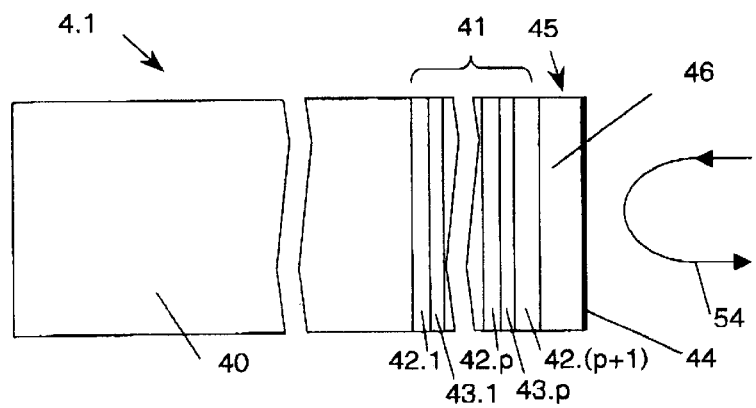
FIG. 6 is a schematic cross-section through a first embodiment of a low field enhancement resonant SESAM device according to the invention.

Now turning to an absorber element according to the invention, FIG. 6 illustrates a first preferred design of a LFR SESAM 4.1. The specific design starts with a gallium arsenide (GaAs) substrate 40 of with a thickness range of typically 400 to 650 μm. A dielectric stack mirror 41 (typically called a Bragg reflector) grown on top of this substrate 40 comprises quarter-wave pairs of low-index/high-index material 42.1, . . . , 42.p and 43.1, . . . , 43.p, respectively. The mirror 41 shown starts and ends with a low index material layer 42.1, 42.p+1, respectively, thus having an uneven number of layers.

The manufacturing of Bragg reflectors is well known to those skilled in the art of mirrors. First a quarter wave layer 42.1 of a low-index material, in this case aluminum arsenide (AlAs) with an index of refraction of n=2.89 and a thickness of approximately 134 nm (corresponding to a quarter wavelength of 1550 nm in the AlAs), is deposited onto the substrate 40. The deposition method is typically the well-established techniques of molecular beam epitaxy (MBE) or metal-organic chemical vapor deposition (MOCVD). A high-index layer 43.1 consisting of gallium arsenide (GaAs) with a refractive index of n=3.38 and a quarter-wave thickness of 115 nm is then deposited. Typically this is repeated approximately p=25 to 35 times (i.e., 25 to 35 times a low-index/high-index pair). Then, an other 134 nm AlAs layer 42.p+1 is deposited. Such a Bragg mirror 41 gives a reflectivity of typically higher than 99.5% and preferably higher than 99.9% at the center of its design wavelength. A reflection of incoming light is schematically depicted by an arrow 54.

The materials chosen for the Bragg reflector and the substrate have the following advantages. One advantage is that high quality GaAs substrates are available at moderate cost. Further, the contrast in the refraction index between GaAs and AlAs is high. Thus, Bragg reflectors with relatively few layer pairs and a high reflectivity bandwidth can be manufactured. However, also other substrate and Bragg reflector materials can be used for a device according to the invention. One known example are the Bragg reflectors based on InGaAsP or AlGaInAs with varying concentrations of the elements. The materials of such reflectors do almost not have any lattice mismatch. Also, InP may be incorporated in such reflectors. InP has a not negligible two photon absorption cross section, which effect can be used for suppressing a Q-switched mode-locked regime. The refractive index contrast, however is lower than for GaAs/AlAs making more layer pairs necessary, thus increasing the cost and the required accuracy of the layer thicknesses.

A structure 45 of layers is placed on top of the Bragg mirror 41. The structure 45 comprises a spacer layer 46 and an absorber layer 44. The thickness of the spacer layer is chosen such that, together with the absorber layer, it forms a half-wave layer or a multiple half wave layer, i.e. the thickness is slightly less than an integer multiple of half the wavelength of electromagnetic radiation of the chosen frequency in this material. In the specific embodiment shown, the spacer layer 46 is a GaAs layer of approximately 225 nm thickness. The absorber layer 44 is deposited on top of the spacer layer 46. Note that the different index of refraction of the absorber layer 44 compared to the spacer layer 46 and its thickness have to be taken into account for designing the completed spacer-layer thickness, although for most designs this slight difference is negligible. In one embodiment, the absorber layer 44 is indium gallium arsenide ($In_xGa_{1-x}As$), where the ratio x of the indium is 53% and the ratio of the gallium is 1−x=47%. This sets the absorption bandgap of the semiconductor absorber layer 44 to substantially 1550 nm. (meaning, of course, that $E_G \approx h*c/1550$ nm, where h is Planck's constant and c is the vacuum speed of light). More generally, the preferred range for 1550 nm is set by 50% $\leq x \leq 56\%$.

The structure 45 does not substantially modify the reflectivity or wavelength range of the Bragg mirror 41, except for an increase of the penetration into the mirror structure and a resulting slightly higher transmission loss for a fixed number of Bragg pairs). This design is referred to as a "low field enhancement" design, since unlike e.g. in a Fabry-Perot etalon, the field within the structure is below the field in free space or only moderately enhanced. In the design shown in this figure, the field strength within the structure is smaller than the field strength in free space since there is no Fabry-Perot mirror element above the structure 45. However, due to the resonant design, in the topmost layers the field strength is only slightly below the free space value, as discussed further below. In fact, depending on the point of view, this design could be viewed as a kind of "low-finesse" resonant design, the finesse being of the order of magnitude 1. The absorber layer 44 can be positioned at an arbitrary point in the electric field of the optical beam within the SESAM device 4.1, by selecting the position of the absorber layer 44 within the structure 45.

Preferably, the absorber layer 44 is positioned at or near a maximum of the field intensity in order to achieve maximum saturation of the absorber 44 for a given incident optical intensity, and to achieve a minimum effective saturation fluence for the SESAM 4.1. Thus the absorber layer 44 is preferably placed at a essentially a distance of 0, λ/2, 2λ/2, 3λ/2, . . . , from the top surface of the SESAM device, where λ is the wavelength of the laser radiation in the layer(s) between the absorber layer and the surface. Distance zero means that the absorber layer 44 is placed very near to or at the top surface of the spacer layer, i.e. at the device/air interface.

The thickness of the absorber layer 44 sets the total amount of change in absorption (i.e., the modulation depth ΔR) of the SESAM device 4.1. In our described example, the InGaAs absorber layer 44 is approximately only 5 nm thick. This is substantially less than for absorber layers according to the state of the art. The modulation depth is nevertheless as high as between 1.2% and 2.5%. (the difference depending on the exact growth and fabrication of the SESAM device). This is due to the specific design in which the intensity in the absorber layer is increased by a factor 12 compared to the antiresonant conventional SESAM design. According to other embodiments of the invention, the absorber layer thickness can thus be chosen to be even lower, e.g. anywhere between about 0.5 nm and 5 nm.

The reduced InGaAs thickness brings the solution to a major problem connected with saturable absorbers for 1550 nm lasers. InGaAs is the material of choice in essentially all known saturable absorbers. However, in order to cause the absorption edge to be energetically as low as 1550 nm, the concentration of the In replacing the Ga when going from GaAs to InGaAs has to be really high. The admixture of In in such a high concentration, of course also changes other material properties than the bandgap, one of them being the lattice constant. As a consequence, a much higher lattice mismatch has to be dealt with in 1550 nm SESAMs than, e.g. in 1060 nm SESAMs. For example, the natural, relaxed lattice constant of $In_{0.53}Ga_{0.47}As$ is about 0.583 nm vs. 0.565 nm for GaAs and 0.566 nm for AlAs. InGaAs absorber layers grown onto or in GaAs layers thus tend to relax—i.e. to re-adopt the natural InGaAs lattice constant for the price of a certain, high amount of generated defects—if a certain critical layer thickness is exceeded. The defects substantially reduce the device quality in terms of losses. The SESAM according to the invention makes possible that the absorber layer remains strained, i.e. it can have a thickness below the thickness critical for relaxation.

Defects in the absorber layer may, depending on the particular laser design, also have a positive effect: They reduce the recombination time in the absorber and may thus be advantageous for pulse generating lasers with very high repetition frequencies. According to embodiments of the invention, the absorber layer thickness therefore may also be chosen to be above the relaxation threshold, i.e. above about 2 nm. It is a crucial aspect of the device according to the invention that the massively increased field intensity at the position of the absorber introduces new design degrees of freedom. The absorber layer thickness and thus indirectly the defect density may be chosen according to the particular needs, whereas according to the state of the art the requirements of sufficient modulation depth of low losses, and of being off the QML did not leave much choice for the SESAM design.

Additionally, the massively reduced saturation fluence relaxes the requests on the cavity design for lasers with very high repetition rates (>10 GHz), which before often have been driven by the very small spot size in the SESAM required to saturate it given the rather low intracavity pulse energies.

Whereas in the described example the absorber layer is an InGaAs layer, also other materials known to the expert may be used. An interesting material in this context is $In_xGa_{1-x}As_{1-y}N_y$, where x is about in the region defined by $4,5\% \leq x \leq 7,5\%$, and where y is chosen such that there is a reduced or no lattice mismatch between the absorber material and GaAs or AlAs, i.e. y=a few percent. Typically, for y=2,729*x, the structure is totally lattice matched to GaAs (001).

It is worth noting that the absorber layer thickness is approaching a value where quantum-well effects can be measured. If there is a measurable exciton, this can be tuned by temperature to optimize the saturation fluence of the absorber layer 44. Note however that quantum well effects are not essential for proper SESAM operation, and the absorber layer thickness is a parameter chosen to achieve a desired modulation depth ΔR.

Figure 7:
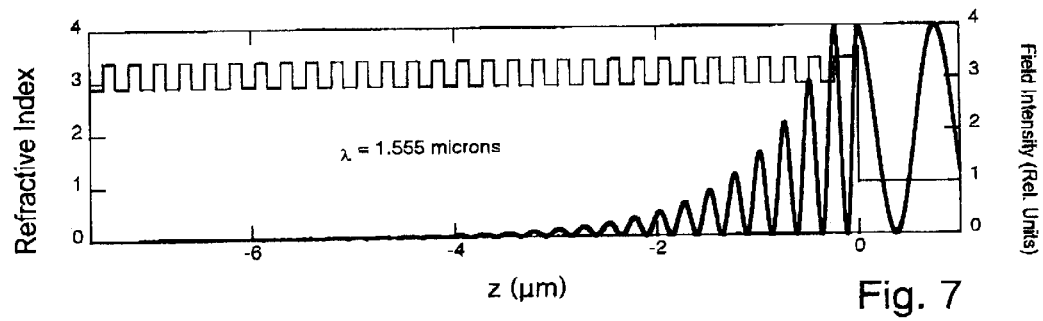
FIG. 7 is a graphical representation of the relative field intensity and the refractive index vs. position for this SESAM device.
Figure 8:
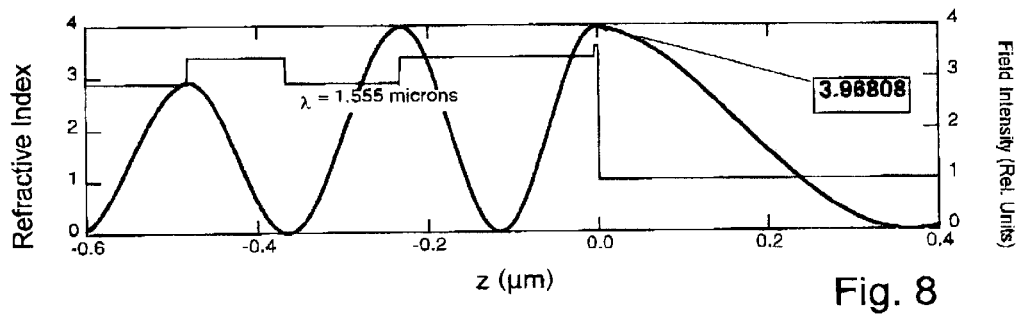
FIG. 8 is a close up of FIG. 7 for the topmost part for the SESAM.

FIG. 7 shows the relative field intensity and the index of refraction versus a position for a SESAM device according to the invention, i.e., the embodiment shown in FIG. 5. FIG. 8 shows a close-up of the field and refractive-index map of FIG. 7 in the region of the spacer layer. In contrast with the SESAM of FIGS. 1 and 2, the spacer layer of the SESAM device according to the invention has a thickness such that the structure 45 on top of the Bragg reflector 41 layer essentially fulfills a resonance condition for the standing electromagnetic waves in the spacer layer. In other words, the design is such that the field intensity reaches a local maximum in the vicinity of the device surface, i.e. at the device/air interface. As described above, in this design, the Bragg mirror's 41 outermost layer (i.e. the layer which is most distanced from the substrate) is a low-index layer 42.p+1. Thus the resonance condition is equivalent to the condition that the spacer layer 46 has a thickness of essentially $\lambda/2, 2\lambda/2, 3\lambda/2, \ldots$, where λ is the wavelength of the laser radiation in the spacer layer. Note that in the design of FIG. 6, the absorber layer 44 could also be placed between the Bragg reflector 41 and the spacer layer 46. As yet an other alternative, instead of just one absorber layer, two or more absorber layers of e.g. reduced thickness can be present, preferably all of them placed near local maxima of the intensity.

It should be noted that the maximum relative field intensity at the absorber is about 3.968, i.e., about twelve times as high as in the antiresonant design shown in FIGS. 1 and 2. This results in a decrease in the saturation fluence by a factor of 12.

Figure 9:
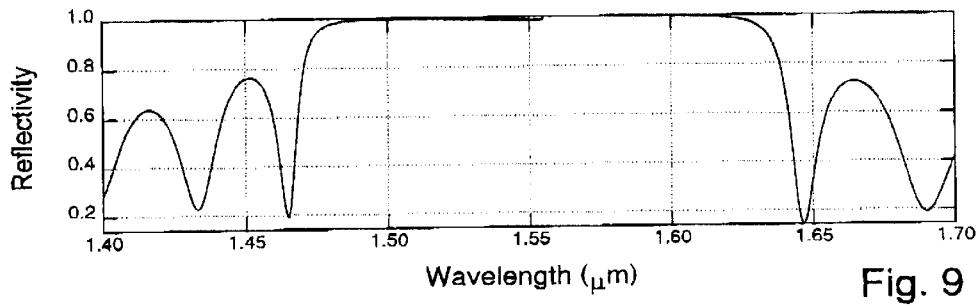
FIG. 9 is a graphical representation of the reflectivity vs. light wavelength for the SESAM device.
Figure 10:
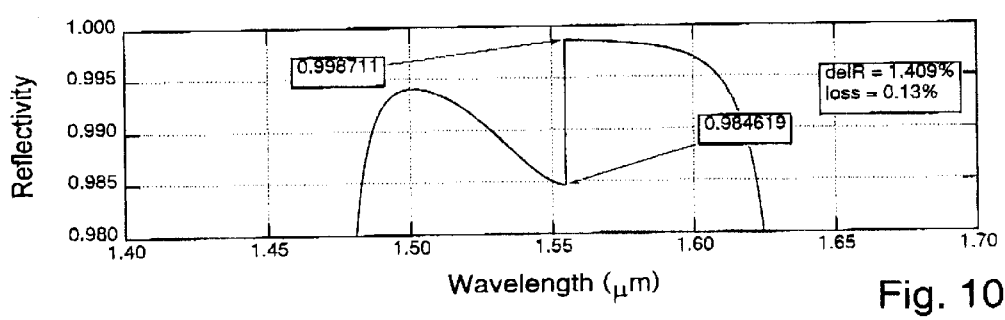
FIG. 10 is a close-up of the center part of FIG. 9 with a different scale

The low-intensity reflectivity calculated for the SESAM of FIG. 6 is plotted in FIGS. 9 and 10. A comparison with FIGS. 3 and 4 shows that this reflectivity curve has a performance very similar to an ideal high-reflectivity mirror or a typical antiresonant SESAM. A first discernible difference are the slightly increased secondary reflection bands. A main difference, however, is the clearly enhanced modulation depth (denoted by delR in all figures) ΔR=1.41%. In addition, the total reflectivity for a given number of low-index/high-index pairs is slightly reduced due to the increased total intensity in the Bragg reflector. The non-saturable losses amount to 0.13%. This can be compensated for by a slightly increased number of Bragg pairs.

Figure 11:
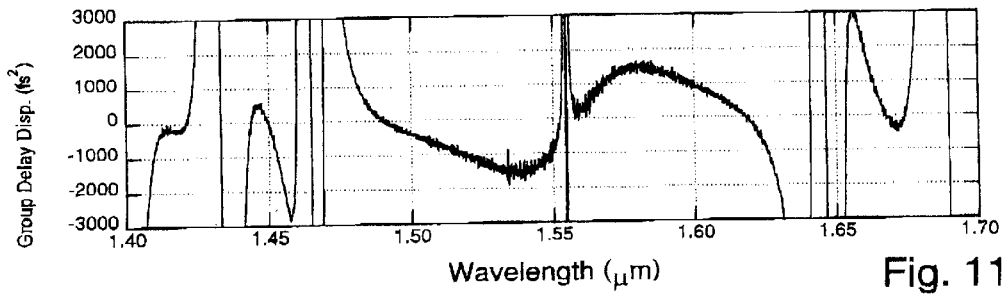
FIG. 11 is a graphical representation of the group delay dispersion vs. light wavelength for the SESAM device.

A graphical representation of the group delay dispersion calculated for the SESAM of FIG. 6 is shown in FIG. 11. The behavior of the curve exhibiting a positive slope can be a disadvantage for ultra-short pulse lasers (in the 10-fs range), but it is negligible for picosecond lasers. Note that as in FIG. 5 and also in the following Figures representing the Group Delay Dispersion the discontinuity at the center design wavelength is due to numerical differentiation and as such is an artefact of the calculation.

With reference to FIGS. 12 through 49, different embodiments of the SESAM according to the invention are described. In order to make the description more concise, only the differences to the SESAM of FIG. 6 are pointed out. In analogy to the above figures, these figures also comprise representations of the refractive index and the intensity vs. position as well as of the reflectivity and the group delay dispersion vs. wavelength. The values of the relative intensity at the absorber position, of the modulation depth and of the non-saturable losses are shown in the figures and mostly not mentioned any further in the text. In all shown examples, the intensity at the position of the absorber is about twelve times as high as in the standard SESAM of FIGS. 1–5, except for the embodiment of FIGS. 43–48, where it is even higher.

Figure 12:
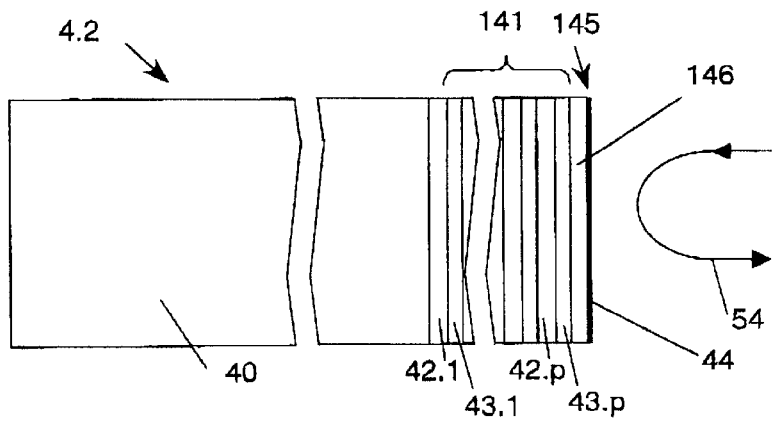
FIGS. 12–17 represent a schematic cross section, a graphical representation of the relative field intensity, a close up of said graphical representation, a representation of the reflectivity vs. the light wavelength, a close up of said representation and a graphical representation of the group delay dispersion, respectively, for a second embodiment of the low field enhancement resonant SESAM device according to the invention.

The SESAM 4.2 of FIG. 12 has a Bragg reflector 141 with an even number of layers, i.e. an entire set of Al/As 134 nm/GaAs 115 nm pairs. The structure 145 consists of approximately 129 nm AlAs (i.e. the low index material) spacer layer 146 and a 5 nm $In_{0.53}Ga_{0.47}As$ absorber layer 44 at the SESAM top surface. The spacer layer 146 and the absorber layer 44 add up to substantially a quarter-wave layer. Of course, the thickness of the absorber layer 44 may, as in all other examples, be adapted to the desired modulation depth. The thickness of the low index material spacer layer 146 may, as an alternative to the shown set-up, have an arbitrary number of other half-waves added to it making the structure 145 a 3/4, 5/4, . . . wave layer.

Figure 13:
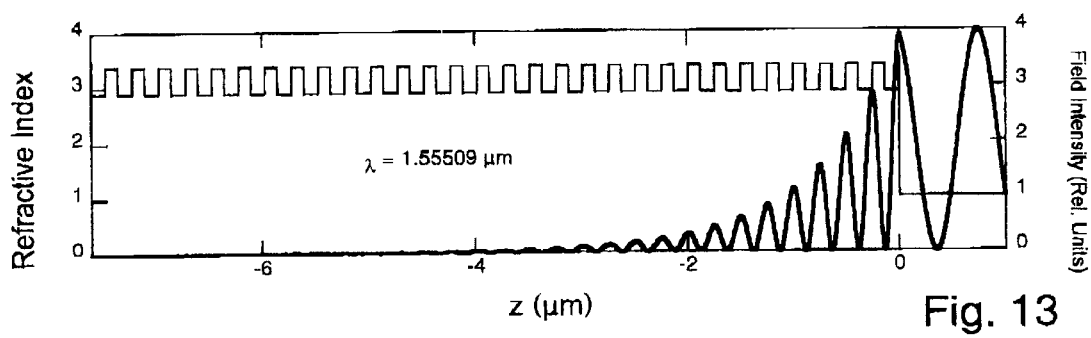
Figure 14:
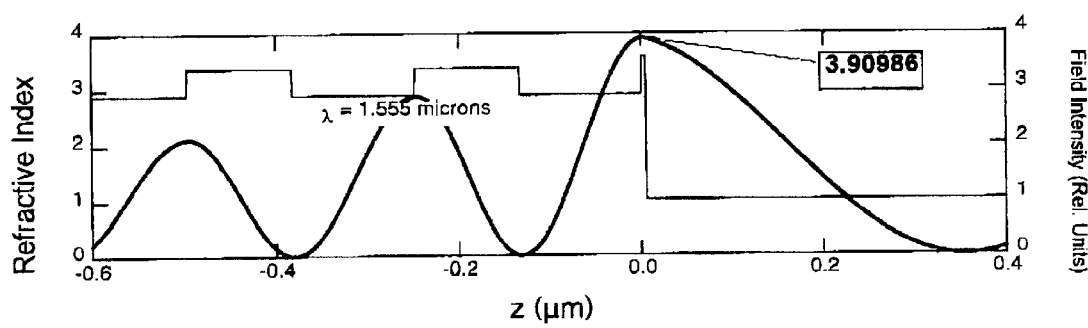
Figure 15:
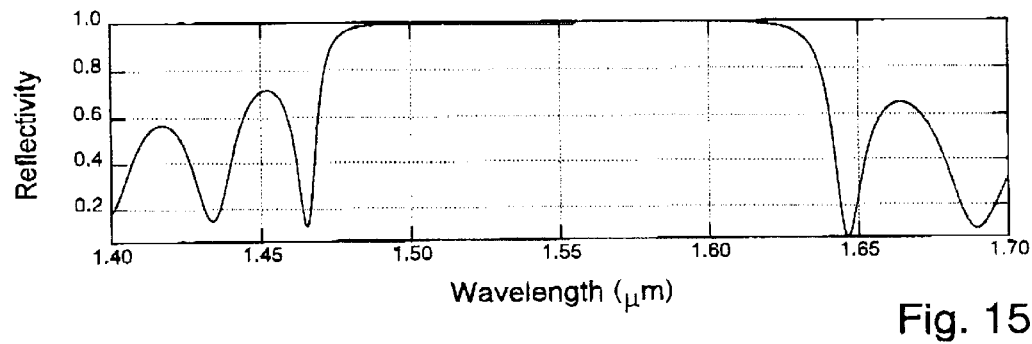
Figure 16:
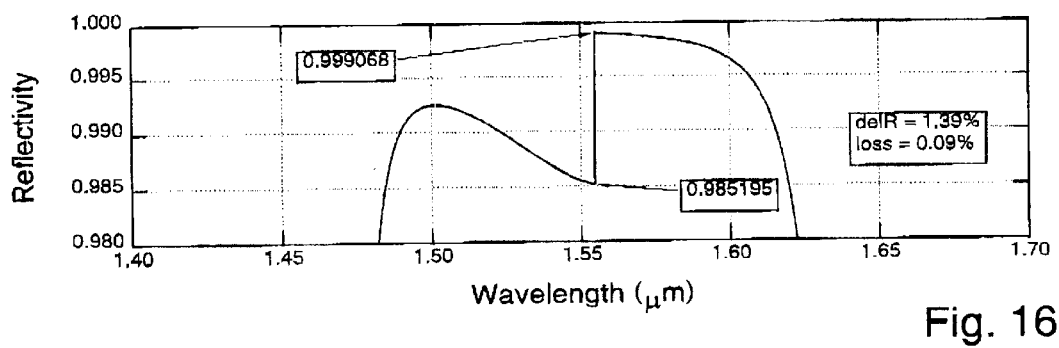
Figure 17:
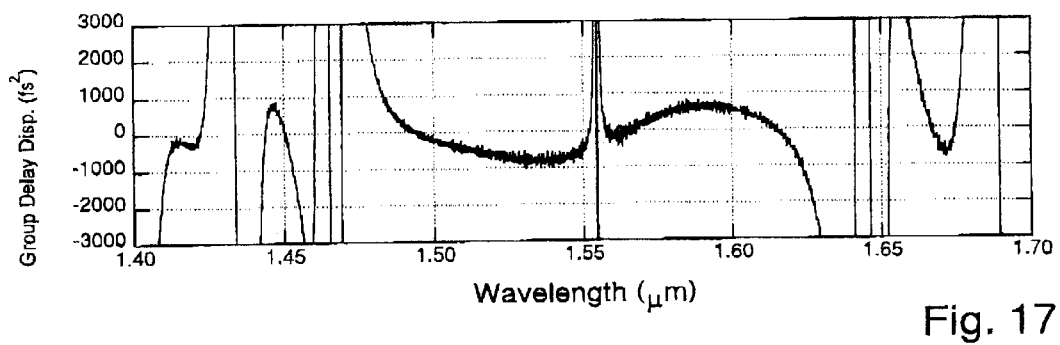

FIGS. 13 and 14 demonstrate, that also for the SESAM 4.2 of FIG. 10, the relative intensity at the position of the absorber layer is enhanced by about a factor of 12 relative to the antiresonant design.

Figure 18:
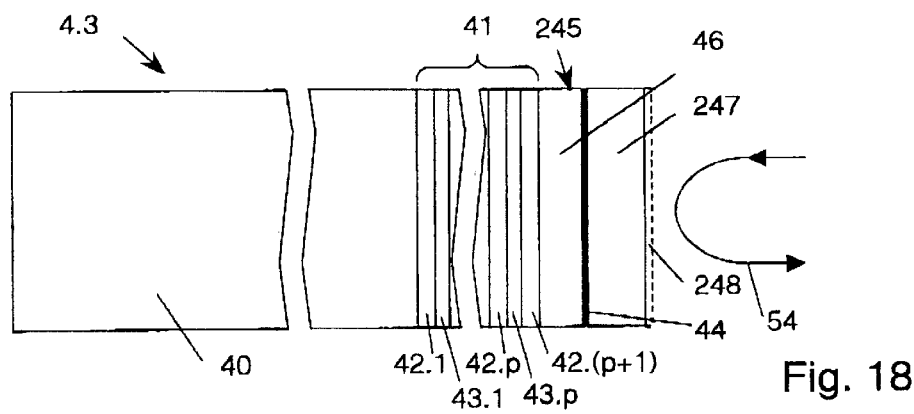
FIGS. 18–23 represent a schematic cross section, a graphical representation of the relative field intensity, a close-up of said graphical representation, a representation of the reflectivity vs. the light wavelength, a close up of said representation and a graphical representation of the group delay dispersion, respectively, for a third embodiment of the low field enhancement resonant SESAM device according to the invention.
Figure 19:
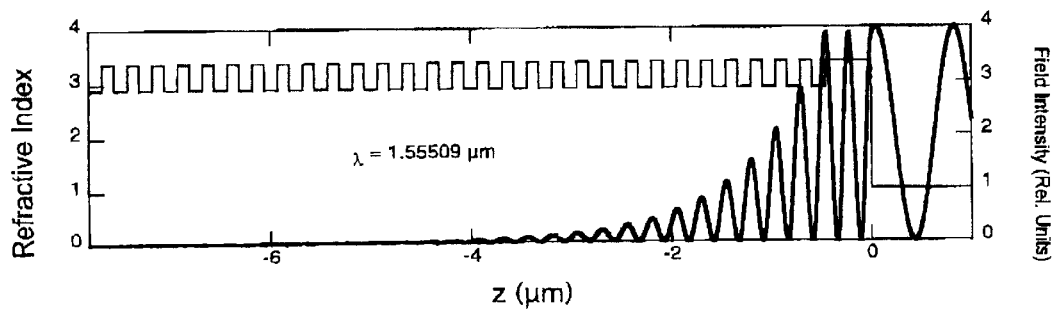
Figure 20:
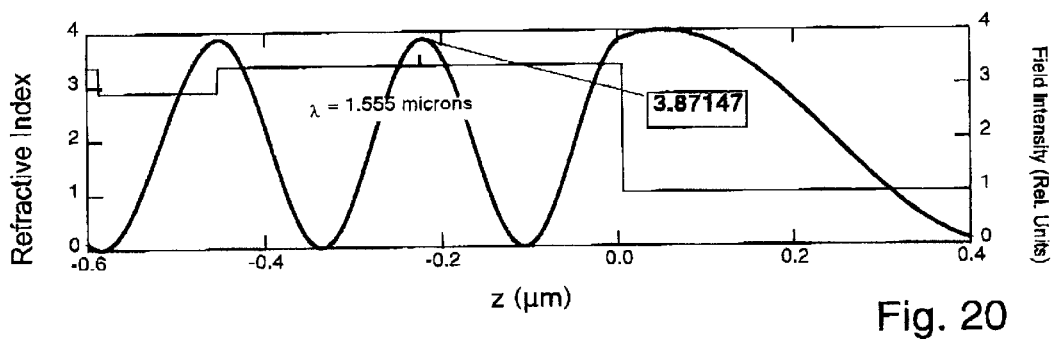
Figure 21:
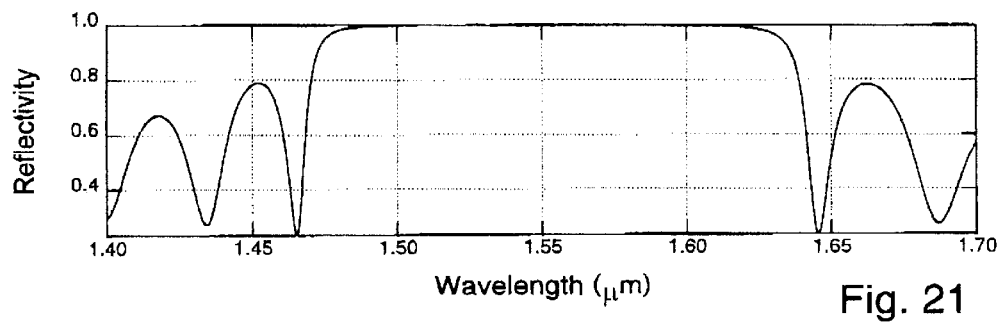

The SESAM 4.3 of FIG. 18 is an example of a device with a buried absorber layer, i.e. an absorber layer 44 placed within the structure 245 at a position at or near a local maximum. The structure 245 comprises a first GaAs layer 46 of approximately 229 nm thickness. The $In_{0.53}Ga_{0.47}As$ absorber layer 44 has a thickness of about 1 nm only. The absorber layer thickness is thus below the critical thickness, and the absorber layer is strained and not relaxed. Together with the first GaAs layer, forms a half-wave layer. A second GaAs layer 247 (thickness: 230 nm. i.e. a half-wave layer) completes the structure. The structure can be viewed as consisting of a spacer layer with an embedded absorber layer, the spacer layer being formed by the first and the second GaAs layers 46, 247. The second, half-wave GaAs layer during production of the structure by molecular beam epitaxy passivates the surface of the absorber layer. Additionally, compared with the SESAM of FIG. 6, it substantially improves the thermal response, i.e. it helps to transport away the heat created in the absorber layer during a laser pulse. Compared to the exposed SESAM device 4.1 of FIG. 6, it does not substantially change the device response, except for the group delay becoming slightly more enhanced.

Figure 22:
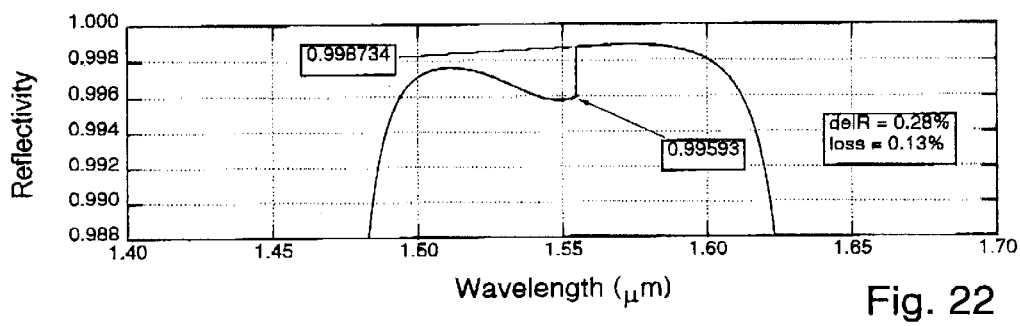
Figure 24:
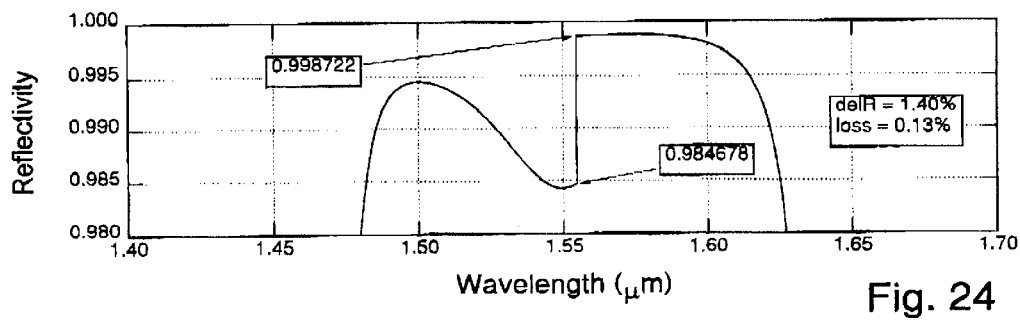
FIG. 24 shows a representation of the reflectivity vs. the light wavelength of an embodiment similar to the embodiment of FIGS. 18–22 but with a thicker absorber layer

Due to the reduced absorber layer thickness (compared to the SESAM 4.1 of FIG. 6), the modulation depth only amounts to 0.28%, as can be seen in FIG. 22. Generally, by varying the absorber layer thickness, the modulation depth may be tuned. FIG. 24 shows a reflection vs. wavelength curve calculated for a structure corresponding to the SESAM 4.3 of FIG. 18 but with an increased absorber layer thickness of 5 nm instead of 1 nm. Apart from the different modulation depth increased by a factor of 5, such a structure largely has identical properties to the SESAM of FIG. 18.

It may further be desirable to passivate and protect the surface of the second semiconductor layer 247, i.e., to prevent contaminants and oxidants from possibly degrading the optical qualities of the semiconductor material. In this case, it is possible to put a very thin layer 248 (optional) of a material such as silicon (Si) directly on the top of the second semiconductor layer 247. If this passivating (or protection) layer 248 is very thin, it does not substantially change the optical properties of the SESAM device 4.3. However it will sufficiently protect and passivate the top surface. For example, several nanometers (typically 2 to 20 nm, preferably 2 to 4 nm) of silicon can be directly deposited on the top surface of the SESAM 4.3 after it has been fabricated in an MBE or MOCVD system. This coating step can be done in the same system before the SESAM device 4.3 has been removed from the coating chamber, which is under high vacuum, and before it has been exposed to possible contaminants and oxidants (oxygen and water vapor in room air, for example). The passivating layer 248 lets us operate the SESAM device 4.3 at higher optical intensities before damage occurs, which in turn facilitates achieving higher repetition rate mode-locking as described by Eq. (1), by improving the fluence ratio on the SESAM device 4.3.

Although this is not explicitly shown in the drawings, also the previously described SESAM devices 4.1, 4.2 or any other SESAM devices may be provided with such a passivating layer. The passivation material, of course may be adapted to the specific chemical and physical properties of the outermost layer of the SESAM device. Depending on the set-up, the thickness of layers present in the SESAM device may be slightly reduced if a passivating layer is present in order to maintain the resonant condition.

Figure 25:
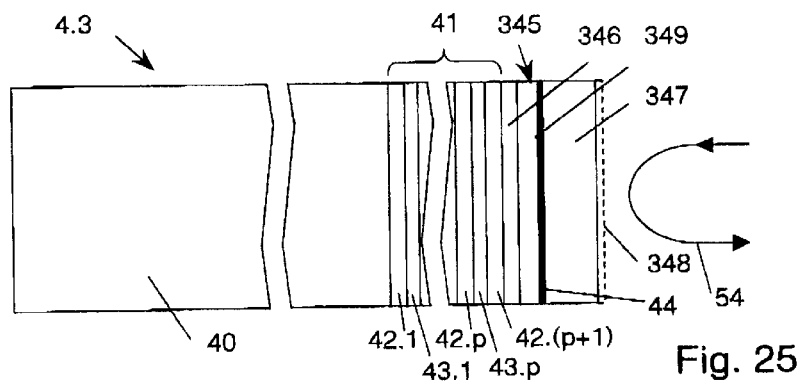
FIGS. 25–30 represent a schematic cross section, a graphical representation of the relative field intensity, a close-up of said graphical representation, a representation of the reflectivity vs. the light wavelength, a close up of said representation and a graphical representation of the group delay dispersion, respectively, for a variant of the third embodiment of the low field enhancement resonant SESAM device according to the invention.
Figure 26:
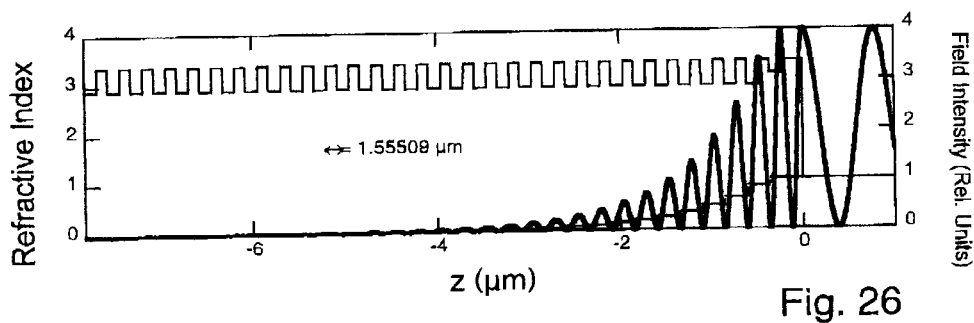
Figure 27:
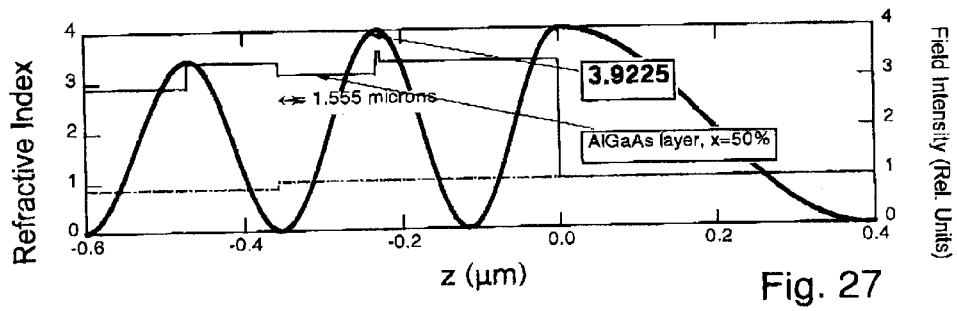
Figure 28:
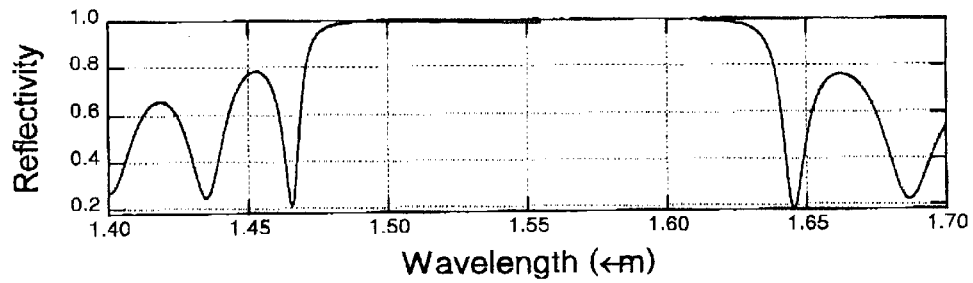
Figure 29:
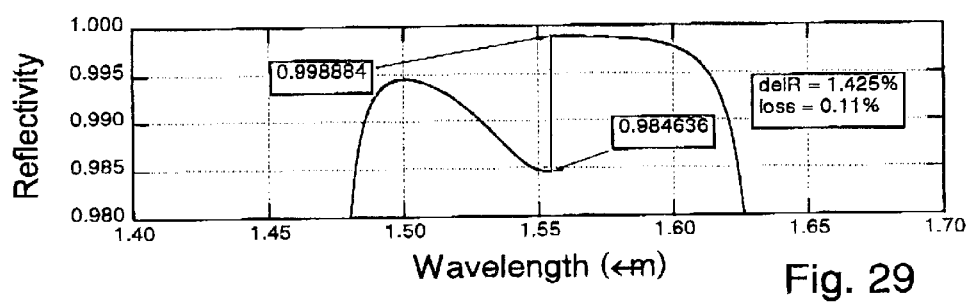

A variant 4.4 of this SESAM embodiment 4.3 is shown in FIG. 25. In comparison with the SESAM 4.3 of FIG. 18, in the SESAM 4.4, the first half-wave GaAs layer 46 is replaced by two quarter wave layers 346, 349, the first one being a GaAs quarter wave layer, the second one being $Ga_xAl_{1-x}As$ with $0<x<1$. For $x\_0.5$, the index of refraction of this material is about in the middle between the index of refraction of GaAs and of AlAs. By this measure, compared to the embodiment 4.3 of FIG. 18, the group delay dispersion is reduced, the modulation depth is increased, and the background losses are reduced. FIGS. 26–30 are representations of the respective data. A further advantage of this embodiment may be that the growth quality of the InGaAs material on AlGaAs tends to be better than on GaAs.

This embodiment is merely one example of variations of the embodiments described here but with varied materials with other indexes of refraction. Various other embodiments involving heterogeneous or homogeneous layers of all kinds of semiconductor or insulator materials may be envisaged.

Instead of two half-wave layers, the structure may comprise a spacer layer, the thickness of which is such that, together with the embedded absorber layer, it forms a 3/2-, 4/2-, 5/2-, . . . -wave layer. The absorber layer, in any case, is placed at or near one intensity maximum in the spacer layer. Several absorber layers placed at or near the respective maxima in the spacer layer may be present instead.

Figure 31:
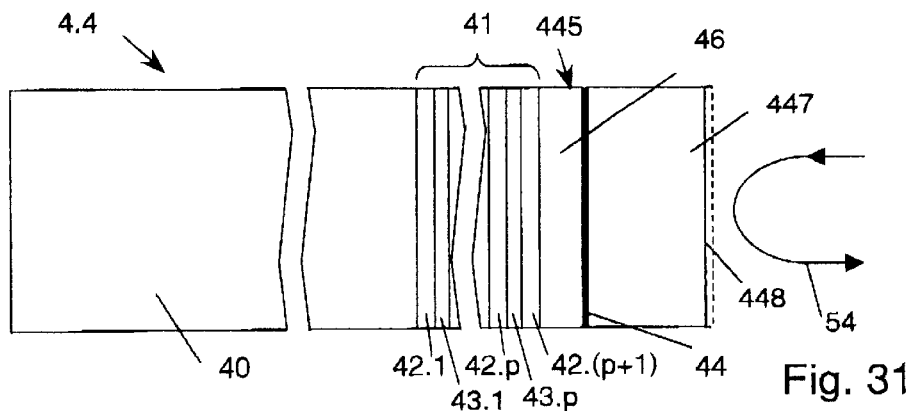
FIGS. 31–36 represent a schematic cross section, a graphical representation of the relative field intensity, a close-up of said graphical representation, a representation of the reflectivity vs. the light wavelength, a close up of said representation and a graphical representation of the group delay dispersion, respectively, for a further embodiment of the low field enhancement resonant SESAM device according to the invention.
Figure 32:
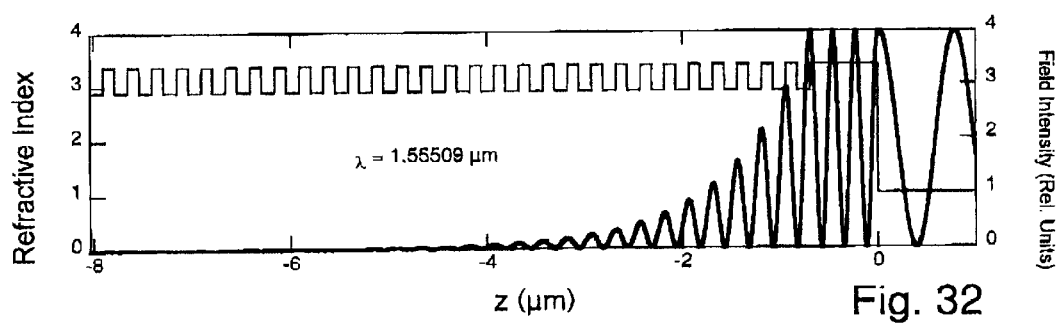
Figure 33:
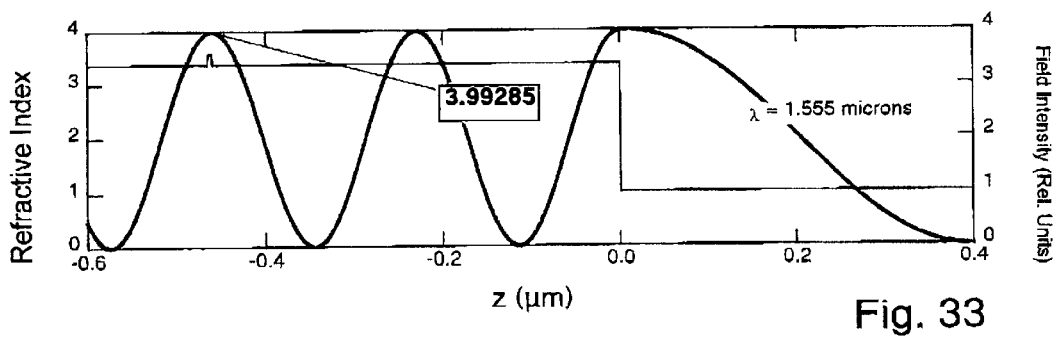
Figure 34:
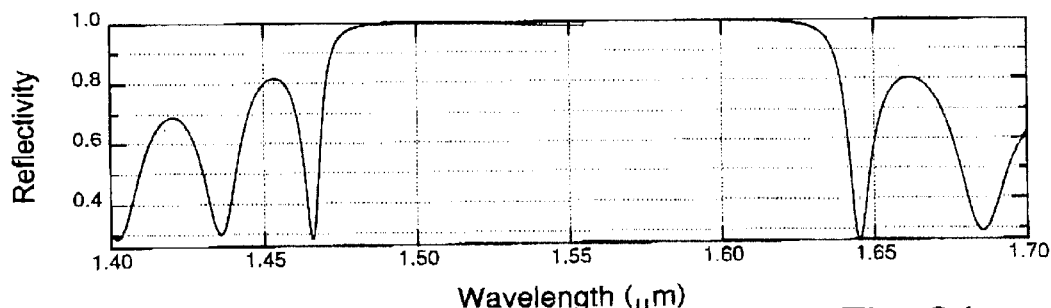
Figure 35:
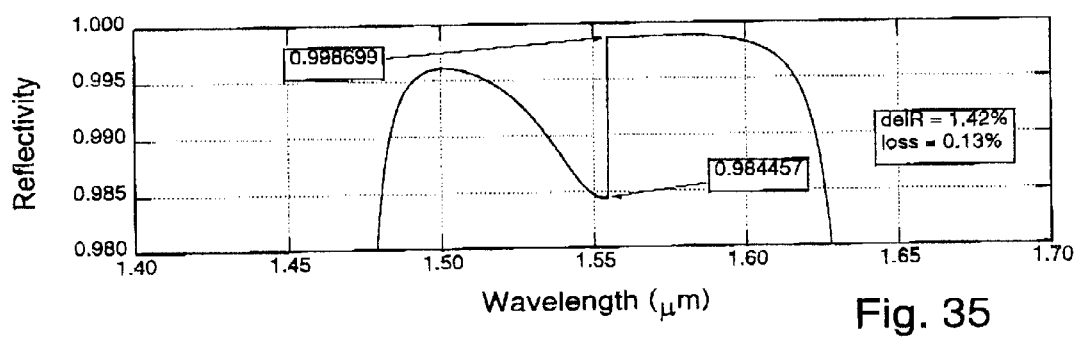
Figure 36:
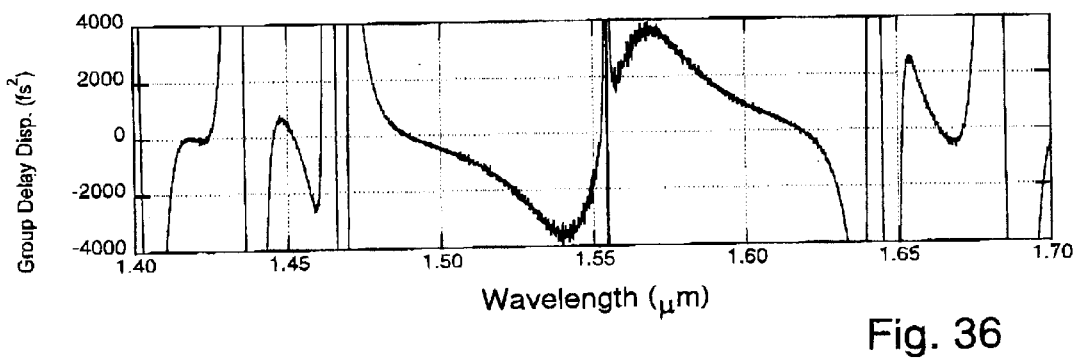

An example of such a SESAM device 4.5 is shown in FIG. 31. The structure 445 comprising the absorber layer 44 contains two GaAs layers 46, 447 adding up to a spacer layer of a total thickness of 3/2 times the wavelength in this material. The absorber layer is placed at or near a local intensity maximum within the structure 445, i.e. at a distance of a multiple half wavelength from the device surface. In the embodiment shown in the drawing, the absorber layer is two half wavelengths from the surface. Also shown in the figure is a passivating layer 448.

Figure 23:
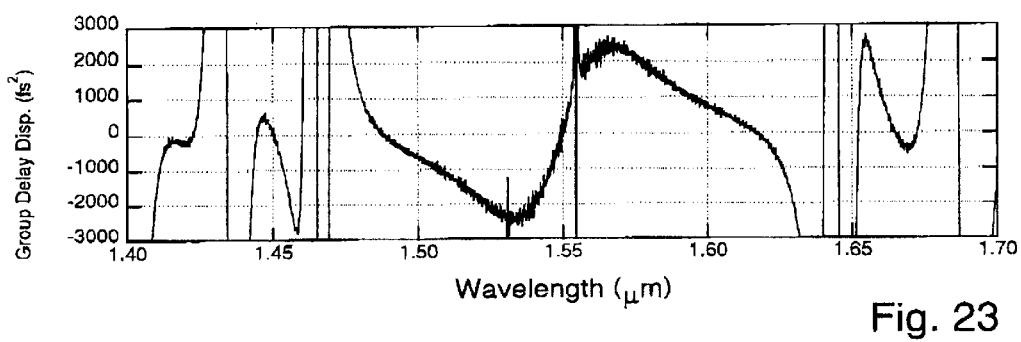
Figure 30:
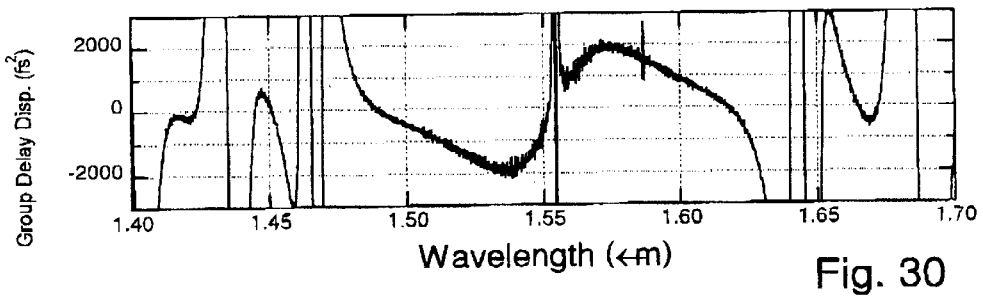

As can be seen from FIGS. 32–36, the device optical properties are similar to the properties of the SESAM device 4.3 of FIG. 18. However the group delay dispersion has a more pronounced wavelength dependence (FIG. 23 vs. FIG. 30).

A further variant (not shown) of the embodiment of the invention of FIG. 18 is a buried absorber layer based on a SESAM device 4.2 as shown in FIG. 12. Instead of a GaAs half-wave second layer 47, an 270 nm AlAs half-wave top layer or an integer multiple of such a half-wave top layer is then chosen. Also this variant does, compared to the exposed SESAM device 4.2, not substantially change the device response but brings about an improved passivation and an improved thermal response. However, AlAs tends to get oxidized at the surface making this variant slightly less preferable, unless it is provided with a passivating layer.

Figure 37:
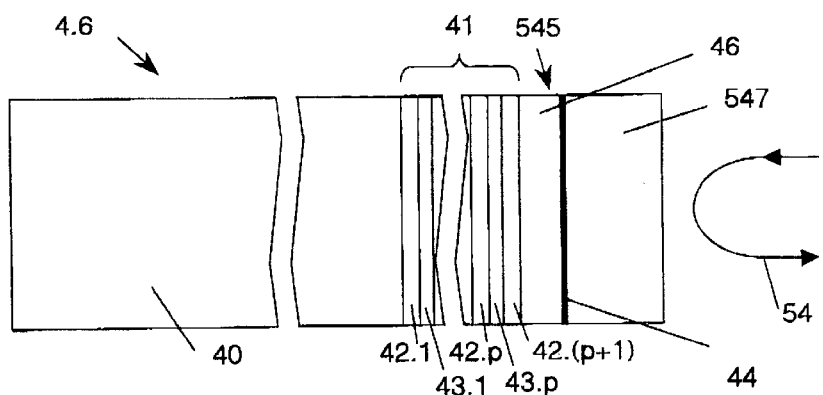
FIGS. 37–42 represent a schematic cross section, a graphical representation of the relative field intensity, a close-up of said graphical representation, a representation of the reflectivity vs. the light wavelength, a close up of said representation and a graphical representation of the group delay dispersion, respectively, for yet a further embodiment of the low field enhancement resonant SESAM device according to the invention.
Figure 38:
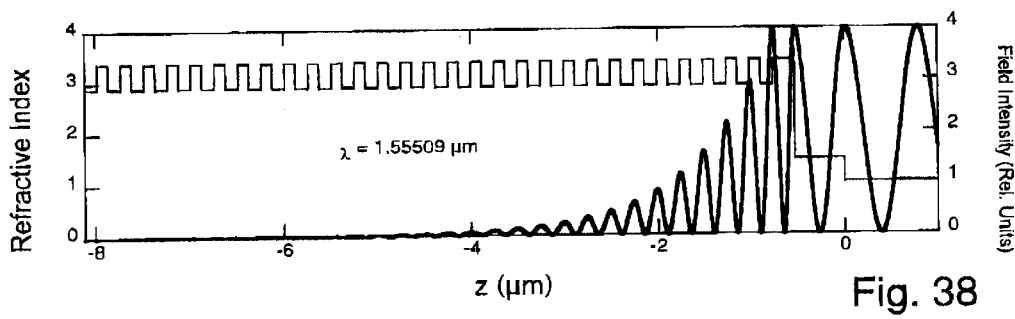
Figure 39:
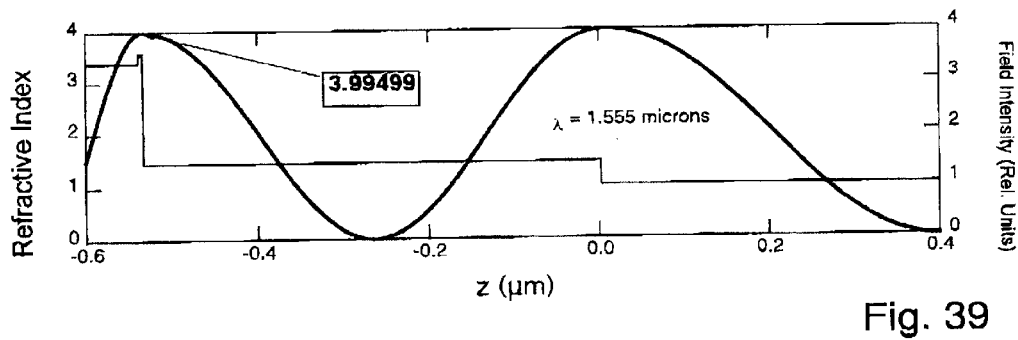
Figure 40:
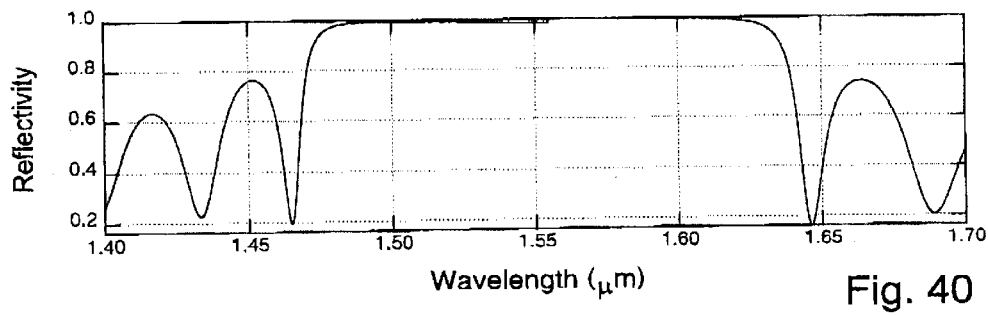
Figure 41:
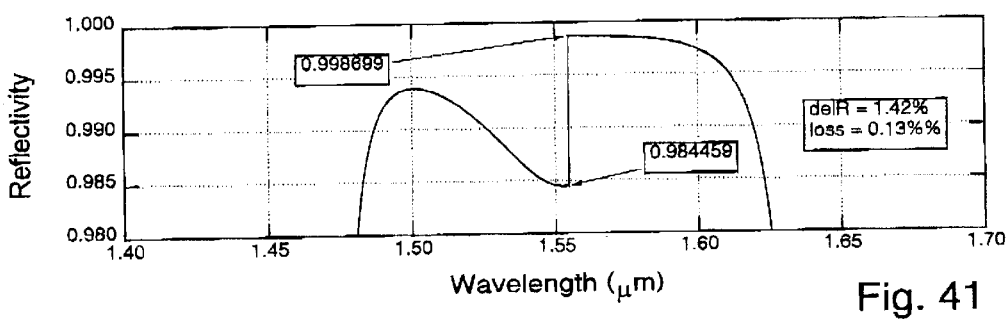
Figure 42:
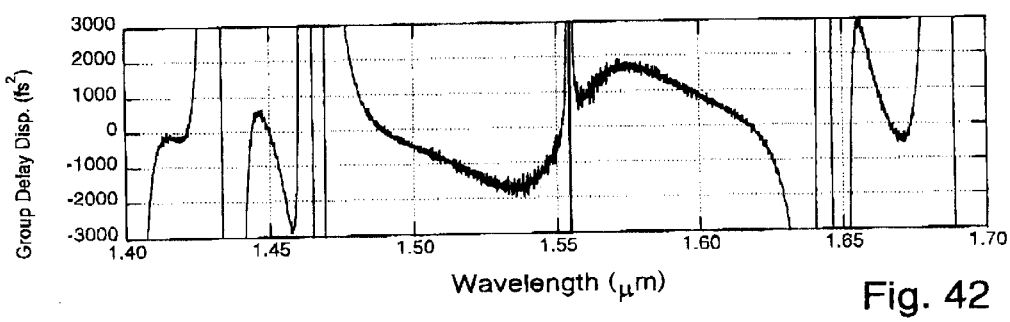

The SESAM device 4.6 of FIG. 37 differs from the embodiment of FIG. 18 in that the second half-wave layer 547 or top layer is made from a different material than the first half-wave layer 46. In the example shown, the layer is a 535 nm $SiO_2$ layer (refractive index: 1.444). In principle, any dielectric material which is transparent for radiation of the given frequency or any combination of such materials may be used to form such a half-wave or multiple half-wave top layer. Depending of the material's crystalline structure, compromises have to be made concerning the material growth. E.g. $SiO_2$ may, of course, not be epitaxially grown onto GaInAs.

Figure 43:
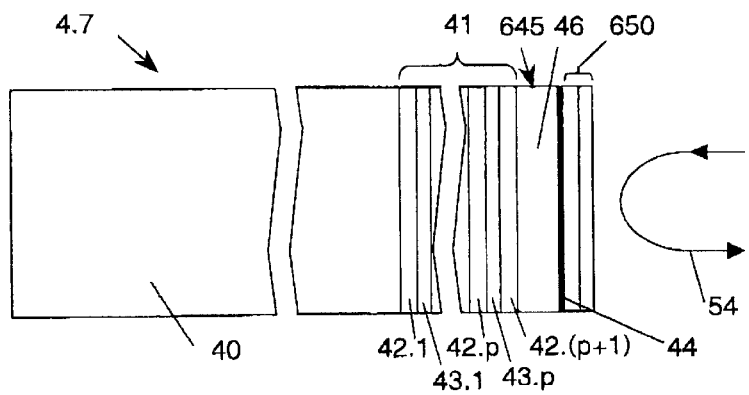
FIGS. 43–48 represent a schematic cross section, a graphical representation of the relative field intensity, a close-up of said graphical representation, a representation of the reflectivity vs. the light wavelength, a close up of said representation and a graphical representation of the group delay dispersion, respectively, for a still further embodiment of the low field enhancement resonant SESAM device according to the invention.
Figure 44:
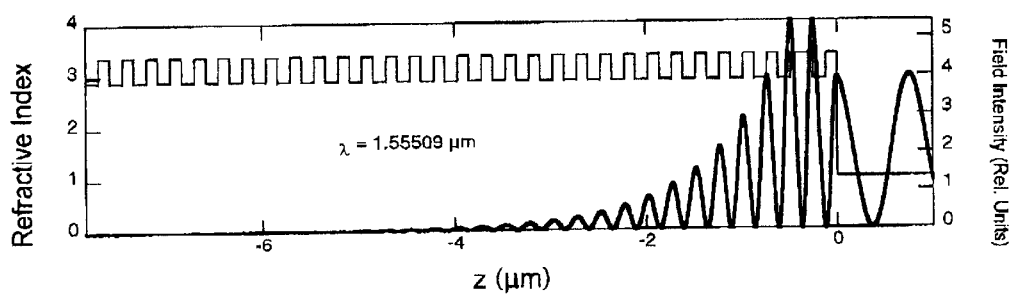
Figure 45:
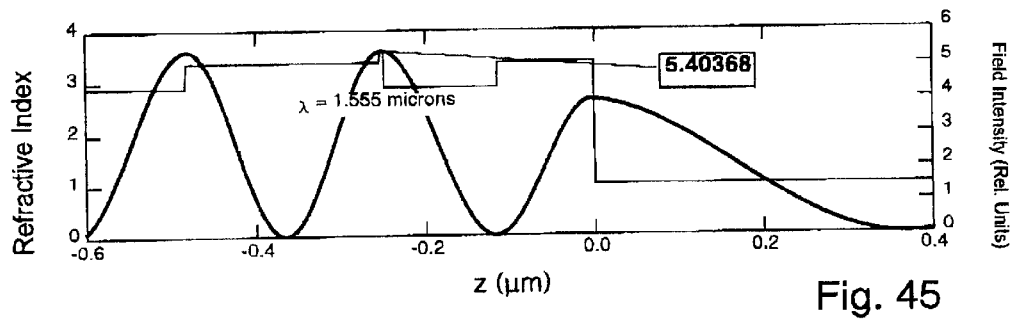
Figure 46:
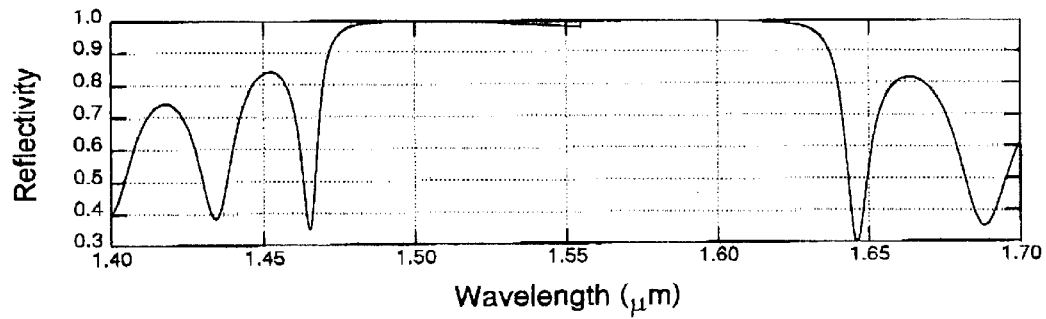
Figure 47:
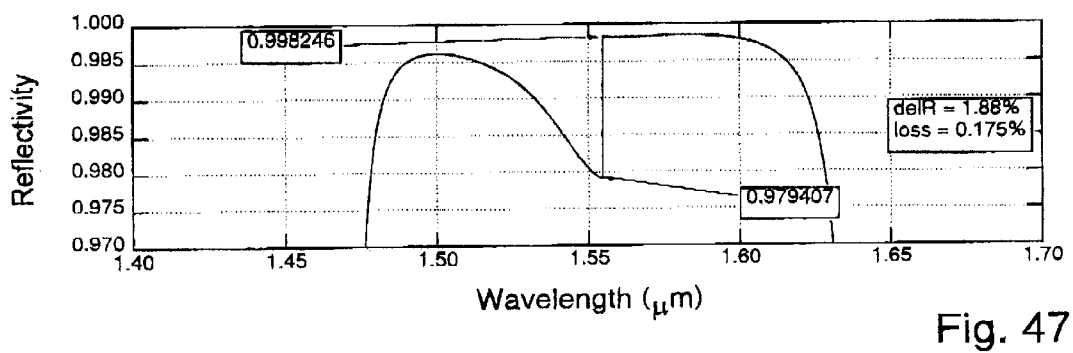
Figure 48:
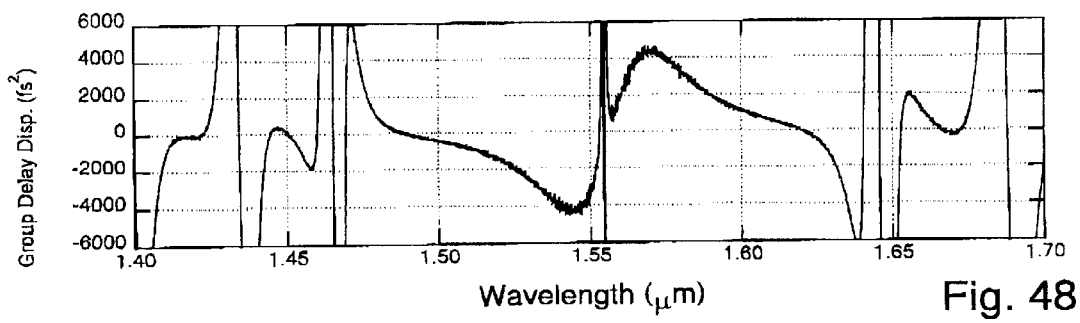

In all previous examples, the structure 45, 145, 245, 345, 445, 545 containing the absorber layer was chosen such that the light intensity within the structure is, however slightly, lower than the intensity in air. However, the invention comprises any devices with low field enhancement resonant structures comprising the absorber layer. An example of a SESAM device 4.7 with a structure 645 comprising means for enhancing the light intensity within the structure 645 compared to the intensity outside of the device is shown in FIG. 43. This SESAM device 4.7 differs from the SESAM device 4.3 of FIG. 6 in that a mirror element 650 comprising a low index and a high index layer (e.g. AlAs and GaAs) is placed on top of the spacer layer comprising the absorber. As can be seen in FIGS. 44 and 45, the intensity at the position of the absorber layer is enhanced compared to the free space intensity. In this embodiment with one two-layer pair, the relative intensity at the position of the absorber layer is 5.4, when the free space intensity maximum as in all previous examples is scaled to be 4. FIGS. 46 and 47 show the effect of this enhanced intensity on the modulation depth, which, for this absorber thickness (5 nm) is as high as 1.88%. From FIG. 48 it becomes obvious that the device also has a high and highly radiation frequency dependent group delay dispersion.

A layer pair as the one shown may be used in all previously described examples in order to enhance the field at the position of the spacer layer, a more pronounced group delay dispersion being, depending on the requirements, a possible disadvantage.

E.g. by adding more layer pairs of the kind of the layer pair 650 of FIG. 43, the field in the device may be even further enhanced. Such devices with moderately enhanced field intensity inside the structure bring about an even enhanced modulation depth and an even reduced saturation fluence, the trade-off being more pronounced optical properties such as the group delay dispersion, a more pronounced temperature dependence of the reflectivity etc. However, depending on the requirements of the laser set-up chosen, a field enhancement up to a factor 2, a factor 5 or even a factor 10 can still be a good choice because of the strongly enhanced modulation depth and the strongly reduced saturation fluence.

Figure 49:
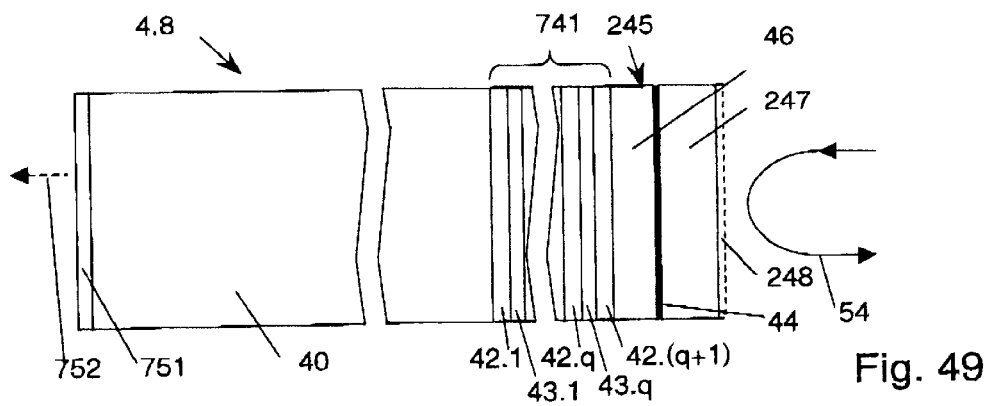
FIG. 49 shows a special embodiment of a low field enhancement resonant SESAM device according to the invention.

According to another embodiment of the invention, any of the above described SESAM devices or any other SESAM device according to the invention may be designed to have a certain residual transmissivity in order to serve as outcoupling device for a laser resonator. An example of such a SESAM device 4.8 is shown in FIG. 49. In the example chosen, the SESAM device 4.8 comprises a Bragg reflector 741 and a structure 245 of layers comprising semiconductor material with a non-linear absorption characteristic of the kind described with reference to FIG. 18. As a first difference to the SESAM device 4.3 described referring to FIG. 18, the Bragg reflector may have a lower number q of quarter-wave pairs and thus have a higher residual transmissivity. As a further difference, this SESAM device 4.8 has an antireflective coating 751 on the face of the substrate 40 which is opposed to the face onto which the Bragg reflector 741 is grown. Antireflective coatings are known in the art and not further described here. Because of this antireflective coating, the radiation proportion transmitted through the Bragg reflector 741 leaves the substrate and propagates into free space, as symbolized by the arrow 752. In high repetition rate pulse generating lasers, the Bragg reflector 741 and the structure 245 are chosen such that the total transmissivity of the device is of the order of magnitude 1%, e.g. 0.05%–3%. Depending on the application the device is used for, the transmissivity may however also be outside of this range.

Of course, also a combination of features of the embodiments of FIGS. 12, 18, 25, 31, 37, 43 and of FIG. 49 may be envisaged.

Now turning to a laser according the invention, the laser comprises an optical resonator, a laser gain element placed inside said optical resonator, means for exciting said laser gain element to emit electromagnetic radiation of said effective frequency, and means for passive mode-locking comprising a SESAM device of the kind described above.

In one embodiment, the laser according to the invention comprises an Er:Yb:glass gain medium pumped by a high-brightness diode laser and a SESAM device as described with reference to FIGS. 6–49. Er:Yb:Glass lasers have, compared to other solid state lasers, an enhanced QML threshold. Concerning Er:Yb:Glass lasers it is referred to the U.S. patent application Ser. No. 09/962,261 filed Sep. 24, 2001. In the following, one example of a laser with an Er:Yb:glass gain element is described here, whereas for more and more sophisticated examples, it is referred to this reference.

Figure 50:
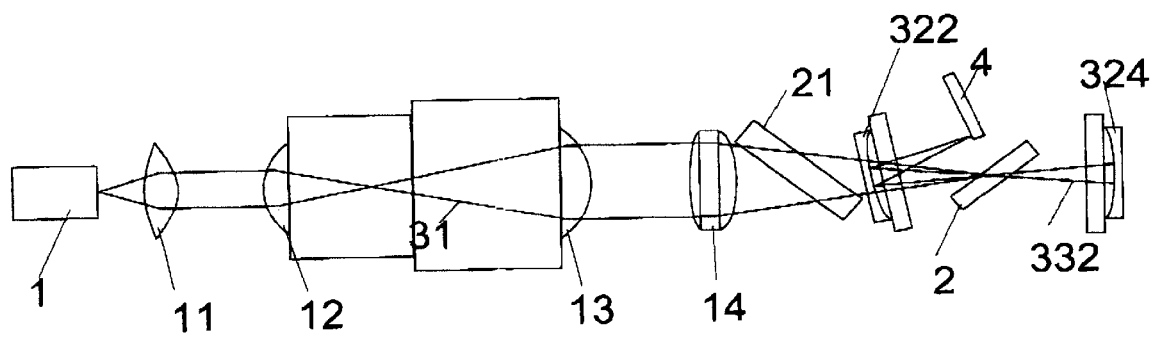
FIG. 50 shows a schematic representation of a laser according to the invention.

Referring now to FIG. 50, a high-brightness, single-mode diode laser 1 (Nortel Model G06d), which emits 980 nm laser light 31 of up to 0.5 W from an aperture size of approximately 1.8 µm by 4.8 µm, is collimated by a short focal length high numerical aperture aspheric pickup lens 11 (focal length 4.5 mm). The beam is then expanded in tangential direction with help of a ×2 (times-two) telescope made of cylindrical lenses 12,13. This telescope turns the elliptic pump beam into an approximately round one and it allows for astigmatism compensation. An achromatic lens 14 is used to focus the pump beam 31 through one cavity mirror 22 down to a radii between 20 and 80 µm in the free space. Between the focusing lens 14 and the cavity mirror 22, a dichroic beam splitter 21 is placed (highly reflective for wavelengths around 1550 nm and highly transmissive around 980 nm under 45° incidence) in order to deflect any laser light directed to the pump laser 1.

Although single-mode pump diodes are preferable, other formats pump diodes may also be used with properly designed pump optics. For example a 1W output power from a 1×50 micron aperture broad area diode laser (slightly reduced brightness, but still a so called high-brightness pump laser) emitting at substantially 980 nm (Boston Laser Model 1000-980-50) can also be used to achieve good lasing performance. The advantage of the higher brightness, and in particular the single-spatial-mode diode laser, which has very high brightness, is that for a given pump mode radius the divergence of the pump beam is smaller. This allows for mode matching of the pump beam to the laser mode over the entire length of the gain element even for very small laser and pump spot sizes and thus results in a maximized saturation parameter $S_{laser}$ of the laser ($S_{laser}=F_{laser}F_{sat,laser}$). The number of elements of the pump optics can reduced by using special astigmatic lenses. Likewise a fiber coupled pump element with a comparable brightness can be used.

This pump source (using varying focal length of the achromatic lens 14) is used for four different laser set-ups which all have in common that they have a small laser mode size in the gain medium as well as on the SESAM. These small mode areas are crucial to suppress the laser from operating in the QML regime. The gain element in all these four cavities is a 1 mm thick Kigre QX/Er phosphate glass doped with 0.8% Erbium and 20% Ytterbium (i.e., the glass melt was doped with 0.8% $Er_2O_3$ and with 20% $Yb_2O_3$). The thickness of the gain medium is chosen to be not significantly more than the absorption length, to minimize the re-absorption losses The described laser cavities contain a Brewster/Brewster-cut gain element. Analogous cavities can be done with flat/Brewster or flat/flat gain elements, compensating for the change in astigmatism.

The cavity shown in the figure is a dog leg cavity. This laser resonator is formed by three mirrors. One is a SESAM device 4 of the kind discussed above. The other ones are concave curved mirrors 322, 324. The first curved mirror 322 has high reflectivity around 1550 nm and high transmission around 980 nm. The second curved mirror 324 is a concave curved output coupler with a transmission of 0.2–2% at the laser wavelength (around 1550 nm). The Er:Yb:glass gain element 2 is inserted under Brewster angle close to the beam waste of the laser beam 332 between mirror the first and the second curved mirror 322, 324. The gain element has dimensions of 9×9 mm² in cross-section with a nominal length of 1 mm (note that the gain element can also be a flat/Brewster element or a flat/flat shaped element with an additional polarization selective element in the cavity). The cavity length is set according to the required laser repetition rate (e.g. about 15 mm for 10 GHz operation). The curvature of the first curved mirror 322 can be much smaller than the cavity length (e.g. radius of curvature 4.1 mm). The curvature of the second curved mirror 324 is chosen so as to get the desired mode size in the gain medium and the desired cavity length. A reasonable value for 10 GHz operation is a radius of curvature of 5 mm. This cavity allows for very small mode sizes of the laser light in the gain medium and on the SESAM, which in addition can be custom designed independently. The mode size of the pump light 31 in the gain element has to be about equal to the mode size of the laser light 332 at this position. This sets the focal length of the focusing lens 14. Again, the dichroic mirror 21 is then use to avoid any feedback of laser light leaking through the high reflector 322 into the pump laser or the pulse generating laser itself. This cavity allows for individual adjustment of the mode sizes in the gain medium and in the SESAM, still having small mode sizes in the gain. In addition to these advantages, this cavity design shows a small effect of spatial hole burning, as the gain element is located far away from the cavity end mirrors compared to the thickness of the gain element. This is beneficial to get transform-limited pulses.

In one specific embodiment, we choose the first curved mirror 322, i.e. the high reflecting mirror, to have a radius of curvature of 4.1 mm, and the second curved mirror 324 to have a radius of curvature of 5 mm with a reflectivity of 99.5% at the laser wavelength. The distance between the Er:Yb:glass 2 and the first curved mirror 322 is approximately 5.2 mm, the distance between the Er:Yb:glass 2 and the curved output coupler is approximately 4.8 mm, and the distance from the first curved mirror 322 to the SESAM 4 is approximately 3.2 mm. This gives a nominal total cavity length of approximately 15.0 mm (taken into account the effective length of the laser gain element 2, i.e., its index of refraction of n=1.521 times its physical length along the optical path of 1.2 mm), which corresponds to a nominal free spectral range (i.e., laser repetition rate) of 10 GHz. In this configuration, the mode radius in the gain medium is 24 µm in the tangential plane and 18 µm in the sagittal plane. On the SESAM, they are 10 µm and 10 µm, respectively.

Of course, the expert in the field will know many other solid state or other (semiconductor etc.) gain media and many other cavity designs for constructing a laser according to the invention. An other preferred example of a gain medium, next to the gain media described in the mentioned US patent application, is Nd:vanadate, Nd:YAG, Nd:YLF, Yb:YAG, Yb:KWG, Nd:glass and many others.

Because the SESAM device according to the invention and the laser according to the invention solve many problems, which are encountered when going to high repetition frequencies above 1 GHz, maybe above 10 GHz or even above 40 GHz at the (future) telecommunication vacuum wavelengths around 1550 nm, according to one preferred embodiment, the absorber device according to the invention is used in a laser for providing light pulses in an optical fiber communication system. However, the expert will know an arbitrary number of further applications the outstanding properties of the device and the laser according to the invention may be used for.

Although all examples described above refer to an optical frequency corresponding to a vacuum wavelength around 1550 nm (a probable standard for fiber optics communication systems within the coming years), adaptations for other optical frequencies are straightforward. E.g. when modifying the devices to be suited for a wavelength of 1064 nm, the layer thicknesses given in the above described examples, except the absorber and passivating layer thickness, have to be multiplied by approximately $1064/1550 \approx 0.69$. The absorber layer composition changes to $In_xGa_{1-x}As$ with $x \approx 0.25$ etc.

Further possible modifications of the described embodiments, which modifications are within the scope of the invention, concern the Bragg reflector. Instead of GaAs/AlAs pairs, other mirror pairs may be used. Examples comprise $(Al_{0.15}Ga_{0.85})_{0.48}In_{0.52}As/Al_{0.48}In_{0.52}As$, $(Al_{0.15}Ga_{0.85})_{0.48}In_{0.52}As/InP$ $In_{0.65}Ga_{0.35}As_{0.73}P_{0.27}/InP$ and others. A further interesting class of compounds for being used in a device according to the invention are the InGaAs-Nitrides (InGaAsN). Adding Nitrides to GaAs/InGaAs reduces the lattice mismatch, so that the InGaAsN absorber layer has less lattice mismatch compared to the GaAs/AlAs Bragg mirror.

Numerous other embodiments may be envisaged, without departing from the spirit and scope of the invention.

What is claimed is:

1. A semiconductor saturable absorber device for serving as means for implementing passive mode-locking in an optical resonator device by saturably absorbing a proportion of electromagnetic radiation of a given optical frequency, comprising a structure of layers, said structure comprising semiconductor material having a nonlinear optical absorption substantially at said frequency, said structure being designed and arranged such that said radiation forms a standing wave in an essentially resonant condition in said structure.

2. The device of claim 1, wherein said structure is designed such that the intensity of said radiation is at or near to a local maximum at a surface of said structure.

3. The device of claim 2 wherein said semiconductor material is placed at or near a position where the intensity is at or near a local maximum.

4. The device of claim 3, wherein the semiconductor material is placed at the surface of said structure.

5. The device of claim 3, wherein said structure is designed in a manner that the field strength anywhere within the device is lower than or equal to or only moderately enhanced compared to the field strength in free space.

6. The device of claim 5, wherein said structure is designed in a manner that the field strength anywhere within the device is lower than or equal to the field strength in free space.

7. A semiconductor saturable absorber mirror (SESAM) device for reflecting electromagnetic radiation of essentially one given optical frequency. comprising a reflective element for reflecting said radiation a structure of layers, said structure comprising semiconductor material having a nonlinear optical absorption substantially at said frequency, said structure of layers and said reflective element being designed and arranged such that said radiation forms a standing wave in an essentially resonant condition in said structure, and wherein said structure of layers and said reflective element are designed and arranged in a manner that the intensity of said radiation in said structure does not exceed the free space radiation intensity of said reflected radiation by more than a factor of ten.

8. The device of claim 7 wherein said structure of layers and said reflective element are designed and arranged in a manner that the intensity of said radiation in said structure does not exceed the free space radiation intensity of said reflected radiation by more than a factor of two.

9. The device of claim 7, wherein said reflective element comprises layers of essentially GaAs and wherein said semiconductor material with a nonlinear optical absorption is essentially an $In_xGa_{1-x}As$ layer with $0.1<x<0.7$ or an $In_xGa_{1-x}AsN_y$ layer with $0.1<x<0.7$ and $y<0.2$.

10. The device of claim 7, wherein said reflective element is a Bragg reflector comprising a stack of quarter-wave pairs of alternately low-index and high-index materials.

11. The device of claim 10, wherein said Bragg reflector is designed in a manner that said optical frequency is $\upsilon=c/\lambda$ with 1525 nm$<\lambda<$1575.

12. The device of claim 11 comprising a GaAs substrate, on which said Bragg reflector is placed, wherein said low-index material is essentially AlAs and wherein said high-index material is essentially GaAs.

13. The device of claim 10, wherein said semiconductor material with a nonlinear optical absorption is essentially $In_xGa_{1-x}As$ with $0.49<x<0.58$.

14. The device of claim 13, wherein said semiconductor material with a nonlinear optical absorption is epitaxially grown onto a spacer layer comprising $Ga_xAl_{1-x}As$ with $0<x<1$ and possibly further comprising additives, and wherein said semiconductor material with a nonlinear optical absorption has a thickness such that it is strained and not relaxed.

15. The device of claim 13, wherein said semiconductor material with a nonlinear optical absorption has a thickness of substantially 6 nm or less.

16. The device of claim 10 comprising a stack of layers placed on a substrate, wherein said Bragg reflector is placed on said substrate, wherein the one layer of said Bragg reflector which is most distanced from said substrate is a layer of low-index material and wherein the structure comprises said semiconductor material with a nonlinear optical absorption and further comprises a spacer layer or a stack of spacer layers of material having an index of refraction which is higher than the index of refraction of the low-index material, wherein the sum of the thicknesses of the spacer layer or of the stack of spacer layers and of said semiconductor material with a nonlinear optical absorption in a direction perpendicular to said Bragg reflector element is $n*\lambda/2$ where $\lambda$ is the wavelength of said radiation in said spacer layer or in said stack of spacer layers and $n\geq 1$ an integer number, and wherein said semiconductor material with a nonlinear optical absorption is embedded in said spacer layer or stack of spacer layers or placed adjacent to said spacer layer or stack of spacer layers.

17. The device of claim 16, wherein said semiconductor material is placed as a layer at a distance of essentially zero or a multiple of a half-wavelength of said radiation in said layer from a surface of said spacer layer, which surface is most distanced from said Bragg reflector.

18. The device of claim 16, further comprising a second reflecting element placed in a manner that said spacer layer with said embedded or adjacent semiconductor material with a nonlinear optical absorption is between said Bragg reflector and said second reflecting element.

19. The device of claim 10, comprising a stack of layers placed on a substrate, wherein said Bragg reflector is placed on said substrate, wherein the layer of said Bragg reflector which is most distanced from said substrate is a layer of high-index material and wherein said structure comprises said semiconductor material with a nonlinear optical absorption and a spacer layer of material having an index of refraction which is lower than the index of refraction of the high-index material, wherein the sum of the thicknesses of the spacer layer and of said semiconductor material with a nonlinear optical absorption is $(2n-1)*\lambda/4$ in a direction perpendicular to said Bragg reflector, where $\lambda$ is the wavelength of said radiation in said spacer layer and $n\geq 1$ an integer number, and wherein said semiconductor material with a nonlinear optical absorption is embedded in said spacer layer or adjacent to said spacer layer.

20. The device of claim 19, wherein said semiconductor material with a nonlinear optical absorption is placed at a distance of essentially zero or a multiple of a half-wavelength of said radiation in said layer from a surface of said layer which is most distanced from said Bragg reflector.

21. The device of claim 19, further comprising a reflecting element placed in a manner that said spacer layer with said embedded semiconductor material with a nonlinear optical absorption is between said Bragg reflector and said reflecting element.

22. The device of claim 7, wherein said semiconductor material with a nonlinear optical absorption is placed at the surface of said structure or is covered only by a passivating layer, the thickness of which is at most a tenth of the wavelength of said radiation in said passivating layer.

23. The device of claim 7, wherein said structure comprises a spacer layer of substantially one material, said semiconductor material with a nonlinear optical absorption being placed within said spacer layer, wherein the sum of the layer thicknesses of said spacer layer and of said semiconductor material with a nonlinear optical absorption in a direction perpendicular to said reflecting element is $n*\lambda/2$ where $\lambda$ is the wavelength of said radiation in said spacer layer and $n\geq 2$ an integer number, and wherein said semiconductor material with a nonlinear optical absorption is placed at or near a local maximum of the intensity of said radiation in said spacer layer.

24. A semiconductor saturable absorber mirror (SESAM) device for reflecting electromagnetic radiation of essentially one given optical frequency, comprising a substrate, a Bragg reflector comprising a stack of quarter-wave pairs of alternately low-index and high-index materials for serving as reflecting element, a structure of layers, said structure comprising semiconductor material having a nonlinear optical absorption substantially at said frequency, said structure of layers and said reflective element being designed and arranged such that the intensity of said radiation is at or near to a local maximum at a surface of said structure, wherein said structure of layers and said reflective element are designed and arranged in a manner that the intensity of said radiation in said structure does not exceed the free space radiation intensity of said reflected radiation.

25. The device of claim 24, wherein said stack of quarter-wave pairs comprises layers of GaAs and of AlAs, and wherein said structure of layers comprises one layer of $In_xGa_{1-x}As$ embedded in a spacer layer of GaAs, at or near a position where the radiation intensity is at a local maximum.

26. The device of claim 24, wherein said reflective element is designed in a manner that said optical frequency is $\upsilon c/\lambda$ with 1525 nm$<\lambda<$1575.

27. A semiconductor saturable absorber mirror (SESAM) device for reflecting a first proportion of electromagnetic radiation of essentially one given optical frequency impinging on said device and for transmitting a-second proportion of said electromagnetic radiation, comprising a substrate, a Bragg reflector comprising a stack of quarter-wave pairs of alternately low-index and high-index materials for serving as reflecting element placed adjacent to a first face of said substrate, a structure of layers placed on said Bragg reflector, said structure comprising semiconductor material having a nonlinear optical absorption substantially at said frequency, said structure of layers and said reflective element being designed and arranged such that the intensity of said radiation is at or near to a local maximum at a surface of said structure, and an anti-reflective coating placed on a second face of said substrate, for further transmitting radiation transmitted through said structure, said Bragg reflector and said substrate, wherein said structure of layers and said Bragg reflector are designed and arranged in a manner that the intensity of said radiation in said structure does not exceed the free space radiation intensity of said reflected radiation by more than a factor of ten.

28. A laser for emitting a continuous-wave train of electromagnetic-radiation pulses characterized by an effective optical frequency, comprising:

an optical resonator, a laser gain element placed inside said optical resonator, means for exciting said laser gain element to emit electromagnetic radiation of said effective frequency, and means for passive mode-locking comprising a reflective element and a structure of layers, said structure comprising semiconductor material having a nonlinear optical absorption substantially at said frequency, said structure being designed and arranged such that said radiation forms a standing wave in an essentially resonant condition in said structure.

29. The laser of claim 28, wherein said structure is designed and arranged such that the intensity of said radiation within said structure is not enhanced compared to the free space intensity of said radiation.

30. The laser of claim 28, wherein said optical resonator and said reflective element are designed in a manner that said optical frequency is $\upsilon=c/\lambda$ with 1525 nm$<\lambda<$1575.

31. The laser of claim 28, wherein said reflective element is a Bragg reflector comprising a stack of quarter-wave pairs of alternately low-index and high-index materials.

32. The laser of claim 31, wherein the layer of said Bragg reflector which is most distanced from said substrate is a layer of low-index material and wherein the structure comprises said semiconductor material with a nonlinear optical absorption and a spacer layer of substantially one material having an index of refraction which is higher than the index of refraction of the low-index material, wherein the sum of the thicknesses of said semiconductor material with a nonlinear optical absorption and of said at least one spacer layer in a direction perpendicular to said Bragg reflector element is $n*\lambda/2$ where $\lambda$ is the wavelength of said radiation in said spacer layer and $n\geq 1$ an integer number, wherein said semiconductor material with a nonlinear optical absorption is embedded in said spacer layer or adjacent to said spacer layer, and wherein said semiconductor material with a nonlinear optical absorption is placed as at least one absorber layer at a distance of essentially zero or a multiple of a half-wavelength of said radiation in said layer from a surface of said layer which is most distanced from said Bragg reflector.

33. The laser of claim 31, wherein the layer of said Bragg reflector which is most distanced from said substrate is a layer of high-index material, wherein the structure comprises said semiconductor material with a nonlinear optical absorption and a spacer layer of substantially one material having an index of refraction which is lower than the index of refraction of the low-index material, wherein the sum of the thicknesses of the spacer layer and of said semiconductor material with a nonlinear optical absorption in a direction perpendicular to said Bragg reflector is $(2n-1)*\lambda/4$ where $\lambda$ is the wavelength of said radiation in said spacer layer and $n\geq 1$ an integer number, wherein said semiconductor material with a nonlinear optical absorption is embedded in said spacer layer or adjacent to said spacer layer, and wherein said semiconductor material with a nonlinear optical absorption is placed as a layer at a distance of essentially zero or a multiple of a half-wavelength of said radiation in said layer from a surface of said layer which is most distanced from said Bragg reflector.

34. Use of a semiconductor saturable absorber mirror (SESAM) device for reflecting electromagnetic radiation of essentially one given optical frequency, comprising a Bragg reflector for reflecting said radiation a structure of layers, said structure comprising a semiconductor material having a nonlinear optical absorption substantially at said frequency, said structure of layers and said reflective element being designed and arranged such that said radiation forms a standing wave in an essentially resonant condition in said structure, and wherein said structure of layers and said reflective element are designed and arranged in a manner that the intensity of said radiation in said structure does not exceed the free space radiation intensity of said reflected radiation by more than a factor of ten, for mode-locking a pulse-generating laser as means for generating laser light pulses with a repetition rate exceeding 1 GHz in a fiber telecommunication system, the laser light having an optical frequency of substantially $\upsilon=c/\lambda$ with 1525 nm$<\lambda<$1575.

* * * * *

UNITED STATES PATENT AND TRADEMARK OFFICE
CERTIFICATE OF CORRECTION

PATENT NO. : 6,538,298 B1
DATED : March 25, 2003
INVENTOR(S) : Weingarten et al.

It is certified that error appears in the above-identified patent and that said Letters Patent is hereby corrected as shown below:

Title page,
Item [73], delete "Gigatera" and insert -- GigaTera --.

Column 17,
Line 22, delete "$u=c/\lambda$" and insert -- $\upsilon=c/\lambda$ --.
Line 34, delete "$0<x<1$" and insert -- $0 \leq x \leq 1$ --.

Column 19,
Line 6, delete "$uc/\lambda$" and insert -- $\upsilon c/\lambda$ --.
Line 10, delete "a-second" and insert -- a second --.
Line 58, delete "$u=c/\lambda$" and insert -- $\upsilon=c/\lambda$ --.

Column 20,
Line 63, delete "$u=c/\lambda$" and insert -- $\upsilon=c/\lambda$ --.

Signed and Sealed this

Twelfth Day of August, 2003

JAMES E. ROGAN
*Director of the United States Patent and Trademark Office*